US010971729B2

(12) United States Patent
Joo et al.

(10) Patent No.: US 10,971,729 B2
(45) Date of Patent: Apr. 6, 2021

(54) HIGH PERFORMANCE ELECTRODES

(71) Applicants: Cornell University, Ithaca, NY (US); Dongjin Semichem Co., Ltd., Incheon (KR)

(72) Inventors: Yong Lak Joo, Ithaca, NY (US); Ling Fei, Ithaca, NY (US); Sunchan Park, Gyeonggi-do (KR); Seon Yeong Gong, Gyeonggi-do (KR)

(73) Assignees: CORNELL UNIVERSITY, Ithaca, NY (US); DONGJIN SEMICHEM CO., LTD., Incheon (KR)

( * ) Notice: Subject to any disclaimer, the term of this patent is extended or adjusted under 35 U.S.C. 154(b) by 32 days.

(21) Appl. No.: 15/775,758

(22) PCT Filed: Nov. 10, 2016

(86) PCT No.: PCT/US2016/061404
§ 371 (c)(1),
(2) Date: May 11, 2018

(87) PCT Pub. No.: WO2017/083566
PCT Pub. Date: May 18, 2017

(65) Prior Publication Data
US 2018/0331365 A1 Nov. 15, 2018

Related U.S. Application Data

(60) Provisional application No. 62/312,871, filed on Mar. 24, 2016, provisional application No. 62/254,418, filed on Nov. 12, 2015.

(51) Int. Cl.
*H01M 4/1395* (2010.01)
*H01M 4/62* (2006.01)
(Continued)

(52) U.S. Cl.
CPC ......... *H01M 4/625* (2013.01); *H01M 4/0404* (2013.01); *H01M 4/0419* (2013.01);
(Continued)

(58) Field of Classification Search
CPC .. H01M 4/325; H01M 4/0404; H01M 4/0419; H01M 4/134; H01M 4/1395;
(Continued)

(56) References Cited

U.S. PATENT DOCUMENTS

2008/0131615 A1* 6/2008 Robertson ................. B05B 1/14
427/483
2011/0143018 A1* 6/2011 Peng .................... H01M 4/0419
427/9
(Continued)

FOREIGN PATENT DOCUMENTS

CN        104150471 A  * 11/2014
WO  WO-2014160045 A1 * 10/2014 ........... D01D 5/0069

OTHER PUBLICATIONS

English translation of CN-104150471-A (Year: 2014).*

*Primary Examiner* — Christopher P Domone
*Assistant Examiner* — Kimberly Wyluda
(74) *Attorney, Agent, or Firm* — Johnson, Marcou, Isaacs & Nix, LLC; Paul J. Roman, Jr.

(57) ABSTRACT

Provided herein are high performance direct deposit electrodes that do not require the use of a binder, as well as processes of manufacturing the same by an electrospray process.

17 Claims, 10 Drawing Sheets

(51) Int. Cl.
  *H01M 4/134* (2010.01)
  *H01M 10/0525* (2010.01)
  *H01M 4/04* (2006.01)
  *H01M 4/38* (2006.01)
  *H01M 4/48* (2010.01)
  *H01M 12/08* (2006.01)

(52) U.S. Cl.
  CPC ......... *H01M 4/134* (2013.01); *H01M 4/1395* (2013.01); *H01M 4/386* (2013.01); *H01M 4/48* (2013.01); *H01M 10/0525* (2013.01); *H01M 12/08* (2013.01); *Y02E 60/10* (2013.01)

(58) Field of Classification Search
  CPC .... H01M 4/386; H01M 4/48; H01M 10/0525; H01M 12/08; Y02E 60/128
  See application file for complete search history.

(56) References Cited

U.S. PATENT DOCUMENTS

| | | | |
|---|---|---|---|
| 2012/0256138 A1* | 10/2012 | Suh | B82Y 30/00 252/503 |
| 2013/0344392 A1* | 12/2013 | Huang | H01M 4/366 429/231.8 |
| 2014/0349191 A1* | 11/2014 | Kung | H01B 1/18 429/231.8 |
| 2015/0321215 A1* | 11/2015 | Huh | B05B 5/1675 427/469 |
| 2018/0013138 A1* | 1/2018 | Chen | H01M 10/0525 |
| 2018/0269480 A1* | 9/2018 | Kim | C01B 33/02 |

* cited by examiner

US 10,971,729 B2

HIGH PERFORMANCE ELECTRODES

CROSS-REFERENCE

This patent application claims the benefit of U.S. Provisional Patent Application Nos. 62/254,418, filed Nov. 12, 2015; and U.S. Provisional Patent Application Nos. 62/312,871, filed Mar. 24, 2016; each of which is incorporated herein by reference in their entirety.

FIELD OF THE INVENTION

The field relates to electrodes, particularly negative electrodes in lithium ion batteries, cells, such as batteries comprising the same, and the manufacturing thereof.

BACKGROUND OF THE INVENTION

Batteries comprise one or more electrochemical cell, such cells generally comprising a cathode, an anode and an electrolyte. Lithium ion batteries are high energy density batteries that are fairly commonly used in consumer electronics and electric vehicles. In lithium ion batteries, lithium ions generally move from the negative electrode to the positive electrode during discharge and vice versa when charging. In the as-fabricated and discharged state, lithium ion batteries often comprise a lithium compound (such as a lithium metal oxide) at the cathode (positive electrode) and another material, generally carbon, at the anode (negative electrode).

SUMMARY OF THE INVENTION

Provided herein are systems and processes for manufacturing directly deposited lithium ion battery thin layer negative electrodes using graphene oxide and silicon inclusions, the graphene oxide comprising a sulfur component (e.g., the sulfur component facilitating good adhesion of the graphene component to the current collector substrate). Also provided herein are lithium ion battery thin film electrodes manufactured by the processes described herein and/or comprising reduced graphene oxide and silicon nanoparticles, the reduced graphene oxide comprising a sulfur component.

In some embodiments, such systems and processes are configured to facilitate high throughput electrospraying using a single or a banked nozzle system. In specific embodiments, the systems and processes are configured for direct voltage ($V_{DC}$) or alternating voltage ($V_{AC}$) electrospraying, such as gas-controlled, direct voltage or alternate voltage ($V_{AC}$) electrospraying. In some embodiments, processes and systems provided herein are suitable for and/or configured to manufacture uniform electrodes (e.g., on a current collector), such as having uniform thickness, capacity, component distribution, etc.

In some embodiments, provided herein is a process for manufacturing an electrode (or electrode material), the electrode comprising (a) a nanostructured inclusion comprising an active material (e.g., electrode active material) and (b) a graphene component comprising sulfur atom(s) or compound(s) (e.g., inserted therein, such as by substituting a carbon or oxygen of a graphene oxide). In specific embodiments, the process comprises producing an electrostatically charged plume comprising a plurality of nanoscale particles and/or droplets from a fluid stock. In more specific embodiments, such a plume is prepared by providing a fluid stock to a first inlet of a first conduit of an electrospray nozzle (e.g., and applying a voltage to the electrospray nozzle). In specific embodiments, the process comprises applying a voltage to the nozzle (e.g., wall of the first conduit). In more specific embodiments, the voltage provides an electric field (e.g., at the first outlet, such as to expel the fluid stock as jet and/or plume from the nozzle, e.g., first outlet thereof). In some embodiments, the first conduit is enclosed along the length of the conduit by a wall having an interior surface and an exterior surface, the first conduit having a first outlet. In some embodiments, the fluid stock comprising a nanostructured inclusion comprising an active material (e.g., an electrode active material), a liquid medium (e.g., water), and a sulfur-containing graphenic inclusion. In some embodiments, the process further comprises collecting a deposition on a substrate (e.g., a conducting substrate, such as a current collector described herein). In certain embodiments, the deposition comprises (a) a nanostructured inclusion comprising an active material and (b) a sulfur-containing graphene oxide component (e.g., a graphene oxide web, such as securing (e.g., wrapping and/or trapping) the nanostructured inclusion comprising the active material therein).

In specific embodiments, the electrode or electrode material is a lithium ion battery negative electrode/material and the substrate is a current collector (e.g., metal foil). In some embodiments, the electrode and/or electrode material has a specific capacity of at least 500 mAh/g (e.g., at least 800 mAh/g, at least 1000 mAh/g, or at least 1,200 mAh/g) after 200 cycles at a charge rate of 1 A/g. In some embodiments, the deposition (e.g., electrode and/or electrode material) is a thin layer deposition having a thickness of about 250 microns or less (e.g., about 200 microns or less, about 25 microns to about 200 microns, or the like).

In some embodiments, the liquid medium of the fluid stock is water. In specific embodiments, the fluid stock or water thereof is acidic (e.g., having a pH of about 1 to about 5). In certain embodiments, the fluid stock is agitated prior to being provided to the first inlet. In specific embodiments, the agitation comprises stirring and/or sonicating the fluid stock. In some embodiments, the fluid stock is provided to the first inlet at a rate of about 0.03 mL/min or more.

In certain embodiments, the active material is, by way of non-limiting example, a silicon material. In specific embodiments, the silicon material is or comprises, by way of non-limiting example, $SiO_x$, wherein x is, e.g., 0 to about 1.5. In certain embodiments, the nanostructure inclusion comprising active material comprises a composite comprising a silicon material and carbon. In specific embodiments, nanostructure inclusion comprising active material is a nanofiber composite comprising a carbon matrix with the silicon material embedded therein. In some embodiments, the silicon material is silicon (e.g., the nanostructure inclusions comprising active material is silicon nanoparticles). In other embodiments, the active material is a tin material. Other active materials and nanostructures comprising such active material are contemplated and discussed herein. In some embodiments, the concentration of the nanostructured inclusion comprising the active material in the fluid stock is about 0.1 wt. % to about 25 wt. %, e.g., about 2 wt. %

In general, the graphene component utilized in a process herein is a graphene oxide component comprising a sulfur component (e.g., a sulfur atom or compound, such as, on the surface thereof). In specific embodiments, the sulfur-containing graphene oxide is nanostructured. In some embodiments, the weight ratio of the nanostructured inclusion comprising the active material to the graphene oxide inclusion in the fluid stock is about 1:1 to about 1000:1, e.g., about 2:1. In certain embodiments, in an electrode or electrode material provided herein, the sulfur-containing graphene oxide inclusions form a graphenic web (or matrix), the graphenic web comprising the sulfur-containing graphene oxide component. In certain embodiments, the graphenic web is about 25 wt. % or more (e.g., about 50 wt % or more, about 60 wt % or more, about 75 wt % or more, about 85 wt % or more, about 90 wt % or more, or about 95 wt % or more) graphene component. In specific embodiments, the graphene component comprises a (e.g., a plurality of) sulfur atom(s) or compound(s) (e.g., inserted therein, such as by substituting a carbon or oxygen thereof).

In certain embodiments, a process provided herein comprises electrospraying the fluid stock with a gas. In specific embodiments, the process comprises providing a pressurized gas to a second inlet of a second conduit of the nozzle. In some instances, providing the pressurized gas to the second inlet provides a high velocity gas at a second outlet of the second conduit. In specific embodiments, the high velocity gas has a velocity of about 50 m/s or more. In certain embodiments, the second conduit is enclosed along the length of the conduit by a second wall having an interior surface, the second conduit having a second inlet and a second outlet, the second conduit having a second diameter, and/or the first conduit being positioned inside the second conduit. In some embodiements, the exterior surface of the first wall and the interior surface of the second wall being separated by a conduit gap. In specific embodiments, the ratio of the conduit overlap length to the first diameter is about 1 to about 100, preferably 10. In some embodiments, the first diameter (e.g., wherien $V_{AC}$ or $V_{DC}$ is utilized) is about 0.05 mm to about 5 mm. In further or alternative embodiments, the second diameter is about 0.1 mm to about 10 mm. In certain embodiments, the conduit gap is about 0.5 mm or higher, or about 1 mm or higher In some embodiments, the first diameter (e.g., wherein $V_{AC}$ is utilized) is about 1 mm or more. In specific embodiments, the first diameter is about 10 mm or more.

In some embodiments, provided herein is an electrode and/or electrode material (e.g., prepared or preparable by a process described herein) comprising nanostructured inclusions (e.g., comprising active electrode material) coated (or wrapped) with sulfur-containing graphene oxide. In other words, in some embodiments, provided herein is an electrode or electrode material comprising nanostructured inclusions (e.g., comprising active electrode material) secured within a sulfur-containing graphenic web.

In some embodiments, the voltage applied to the nozzle is about 8 $kV_{DC}$ to about 30 $kV_{DC}$. In specific embodiments, the voltage applied to the nozzle is about 10 $kV_{DC}$ to about 25 $kV_{DC}$. In other embodiments, the voltage applied to the nozzle is about 10 $kV_{AC}$ or more (e.g., about 15 $kV_{AC}$ or more, or about 20 $kV_{AC}$ to about 25 $kV_{AC}$). In some embodiments, the alternating voltage ($V_{AC}$) has a frequency of about 50 Hz to about 350 Hz.

In certain embodiments, the process further comprises annealing (e.g., thermally and/or chemically) the deposition. In specific embodiments, the process comprises annealing the deposition to a temperature of at least 100° C. (e.g., 150° C. to 400° C., about 150° C. to about 350° C., or about 250° C.). In specific embodiments, thermal annealing is utilized wherein the annealing at least partially reduces the graphene oxide (e.g., reducing the oxygen content thereof, such as to a reduced graphene oxide), e.g., thereby providing a graphenic component in the electrode or electrode material that is different than in the fluid stock (a sulfur-containing reduced graphene oxide).

In certain embodiments, provided herein is a process for producing an electrode and/or electrode material (e.g., a thin layer negative electrode for a lithium ion battery), the process comprising coaxially electrospraying a fluid stock with a gas. In specific embodiments, such electrospraying thereby forms a jet and/or a plume. In some instances, the gas at least partially surrounding the jet, and/or the plume comprises a plurality of nanodroplets. In some embodiments, the fluid stock, the jet, and/or the plume comprises a fluid and an additive, the additive comprising a nanostructured inclusion comprising an active material, sulfur-containing graphenic inclusion, and a liquid medium (e.g., water).

In some embodiments, provided herein is a battery (e.g., a lithium ion battery) comprising an electrode described herein. In specific embodiments, a battery provided herein comprises a positive electrode and a negative electrode, at least one electrode thereof being an electrode described herein. In more specific embodiments, provided herein is a lithium ion battery comprising a negative electrode, a positive electrode, a separator, and an electrolyte, the negative electrode comprising an electrode described herein (e.g., a graphenic web securing a plurality of nanostructured sulfur-containing graphene oxide components therein, the nanostructured inclusions comprising an active (electrode) material).

Provided in certain embodiments herein is an electrode (or electrode/current collector combination) comprising (a) a conductive substrate (e.g., a current collector, such as a metal foil), and (b) a layer or deposition formed on the conductive substrate, the layer or deposition comprising nanostructured inclusion secured (e.g., trapped or wrapped) in a sulfur-containing graphenic web. In specific embodiments, the nanostructured inclusion comprises an electrode active material (e.g., a silicon material or a tin material). In specific embodiments, the graphene component comprises a sulfur atom or a sulfur containing compound. In more specific embodiments, the sulfur atom or compound in the layer is bonded to the conductive substrate (e.g., facilitating securing or attaching of layer to the substrate and, e.g., reducing delamination or exfoliation of the layer from the substrate, such as upon battery cycling). In specific embodiments, the sulfur atom or the sulfur containing compound is contained in the graphene component in an amount of about 0.01 to about 5.0% by weight.

In some embodiments, provided herein are binder-free electrodes, such as made possible by the manufacturing processes described herein. Provided in some embodiments herein is a general method of manufacturing such electrodes using any suitable materials. In some instances, provided herein is a general approach to manufacturing very uniform electrodes, in a very efficient manner. In specific instances, processes described herein provide for the direct deposition of electrode on a conductive substrate (e.g., current collector) without the need for downstream processing, such as drop casting, slurry casting, undergoing long or high temperature drying steps, and/or the like.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
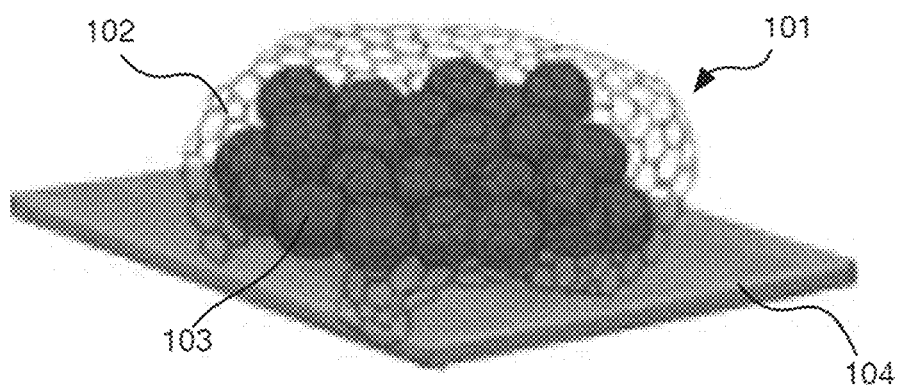
FIG. 1 illustrates an electrode comprising a graphenic web securing nanostructures on a substrate.

Provided in certain embodiments herein are systems and processes for manufacturing electrodes (e.g., thin layer electrode depositions or films, such as on a current collector), and other depositions comprising the components described herein. In some embodiments, the electrode comprises an active electrode material (e.g., a negative electrode in a lithium ion battery, material) and sulfur-containing graphenic material (e.g., a nanostructured graphene oxide, the nanostructured graphene having a nanoscale (e.g., less than 2 micron, or less than 1 micron) structure in any one or more dimension, such as nanostructured particles or sheets). In specific embodiments, the active electrode material comprises a silicon material (e.g., an active electrode, such as a negative electrode in a lithium ion battery, material). In some instances, depositions provided herein are high density (e.g., about 0.5 g/cm$^3$ or more, such as about 0.7 g/cm$^3$ to about 2 g/cm$^3$), flexible, and/or thin layer depositions, which are suitable for any number of energy storage applications, including, e.g., as negative electrodes in lithium ion batteries. In various embodiments, the electrode (e.g., electrode deposition) comprises a sulfur-containing graphenic material and a silicon material. In specific embodiments, the (e.g., nanostructured) graphenic material comprises a graphene component, structure or analog (e.g., graphene (e.g., graphene sheets and/or graphene nanoribbons), graphene oxide (e.g., in the manufacturing process), reduced graphene oxide (e.g., in the electrode, following thermal reduction of the graphene oxide), or the like). In some embodiments, the (e.g., nanostructured) silicon material is dispersed in and/or on a graphenic matrix or web (e.g., wherein the graphene matrix or web comprises a graphene structure or analog as described herein). In certain embodiments, the silicon material comprises a plurality of nanostructures (e.g., such nanostructures comprising a nanoscale (e.g., less than 2 micron, or less than 1 micron) structure in any one or more dimension, such as nanostructured fibers, particles, sheets, rods, and/or the like) comprising a silicon material (e.g., a silicon material that is active in an electrode, such as a negative electrode in a lithium ion battery, such as elemental silicon, and/or a silicon oxide (e.g., having a formula: SiOx, wherein 0≤x<2, e.g., 0≤x≤1.5, or 0<x<1). Also provided in some embodiments herein are articles of manufacture comprising a silicon/carbon deposition described herein, e.g., a thin-layered deposition, manufactured or capable of being manufactured according to the processes described herein. In certain embodiments, provided herein is a substrate, such as a conductive substrate (e.g., current collector), comprising an electrode or deposition described herein on the surface thereof. In addition, provided herein are devices, such as energy storage devices, including, e.g., batteries, such as lithium ion batteries, comprising such materials described herein.

In certain embodiments, provided herein is an electrode (or, e.g., a lithium ion battery comprising such an electrode) comprising a graphenic web securing a plurality of nanostructured inclusions, the nanostructured inclusions comprising an electrode active material (e.g., a negative electrode active material, such as a silicon material described herein). In certain instances, an electrode precursor comprises a graphenic web comprising sulfur-containinging graphene oxide, whereas the electrode comprises a graphenic web comprising sulfur-containing reduced graphene oxide (e.g., following reduction, such as thermal reduction, of the graphene oxide). In some instances, the sulfur content of the graphenic web is reduced during the thermal process, but some sulfur content remains, such as to reduce or minimize separation, delamination or peeling of the electrode from the current collector upon which the film is deposited. FIG. 1 illustrates an electrode deposition 101 on a current collector 104. As illustrated, the electrode may comprise graphenic web 102 securing a plurality of electrode active nanostructures 103. As illustrated in FIG. 1, in some instances, the graphenic material 102, such as graphenic sheets or ribbons (e.g., graphene, graphene oxide (GO), reduced graphene oxide (rGO), or other graphene analogs), wrap and secure the electrode active nanostructures 103. In some instances, the graphenic material 102 securing the electrode active material 103 functions to protect the electrode active material 103 from interactions with electrolyte, from pulverization, and/or the like. In addition, in some instances, such as wherein low electron conductivity electrode active materials are utilized, the graphenic material 102 facilitates electron conductivity in the electrode.

In some embodiments, provided herein is a process for producing an electrode or deposition (e.g., as described herein), the process comprising electrospraying a fluid stock (e.g., comprising a sulfur-containing graphenic material and an electrode active material in a liquid medium) with a voltage (e.g., applying a direct voltage ($V_{DC}$) or an alternating voltage ($V_{AC}$) to an electrospray nozzle, such as provided herein). In specific embodiments, the fluid stock is electrosprayed with a gas (e.g., a controlled gas flow). In certain embodiments, the fluid stock and the gas are ejected from an electrospray nozzle in a similar direction. In some instances, the direction of ejection of the fluid stock and the gas from the electrospray nozzle is within about 30 degrees of one another, or, more preferably within about 15 degrees of one another (e.g., within about 10 degrees or within about 5 degrees of one another). In certain embodiments, the fluid stock and the gas are configured to be ejected from the nozzle in a coaxial or substantially coaxial configuration. In some instances, configurations and processes described herein allow for an enhanced driving force of electrospray, combining the driving forces of electric field gradient with high speed gas. In some instances, configurations provided herein allow for process throughput up to tens or hundreds of times greater than simple electrospray manufacturing and allow for the electrospray of high viscosity and/or highly loaded (e.g., with graphenic and silicon inclusion materials described herein) fluids. Moreover, in some instances, such electrospray techniques and systems provided herein allow for the manufacture of highly uniform electrodes and depositions. By contrast, other or conventional electrospray is not generally of commercial use in many applications because of, e.g., non-uniform deposition of drops and dispersion of fillers in droplets, especially for high loaded systems. In addition, in some instances, the throughput capabilities of other or conventional electrospray systems are not sufficient to be commercially useful in some applications. However, other suitable techniques (e.g., electrospray techniques utilizing the fluid stocks and/or inclusions provided herein) are optionally utilized in the manufacture of electrodes or depositions described herein, as applicable.

In some instances, electrospray (e.g., using a process and/or system provided herein) of the fluid stock results in the formation of a plume comprising a plurality of droplets, or of a jet, which subsequently deforms into a plume comprising a plurality of droplets. In certain instances, electrospray (e.g., using a process and/or system provided herein) of a fluid stock, such as provided herein, results in the formation of a plume comprising a plurality of droplets (collectively referred to herein so as to encompass, e.g., droplet solutions, droplet suspensions, and/or solid particles in an electrospray plume). In some instances, the processes described herein results in the formation of small droplets (e.g., nanoscale droplets) having highly uniform size distributions (e.g., especially relative to standard electrospray techniques).

Figure 2:
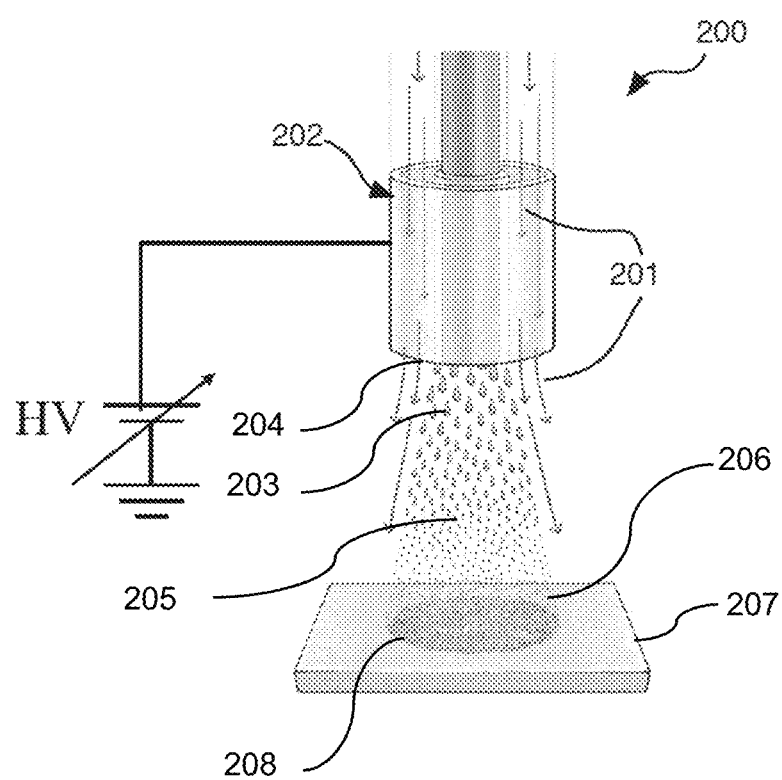
FIG. 2 shows an exemplary illustration of a gas controlled electrospray system and processes provided herein.
Figure 3:
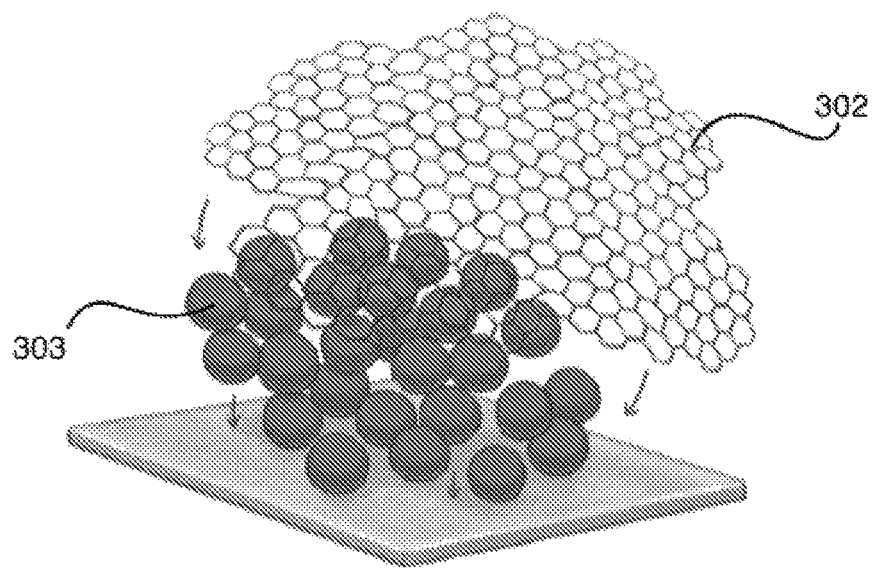
FIG. 3 shows an exemplary illustration of a process of a graphene component securing nanostructures to a substrate.
Figure 4:
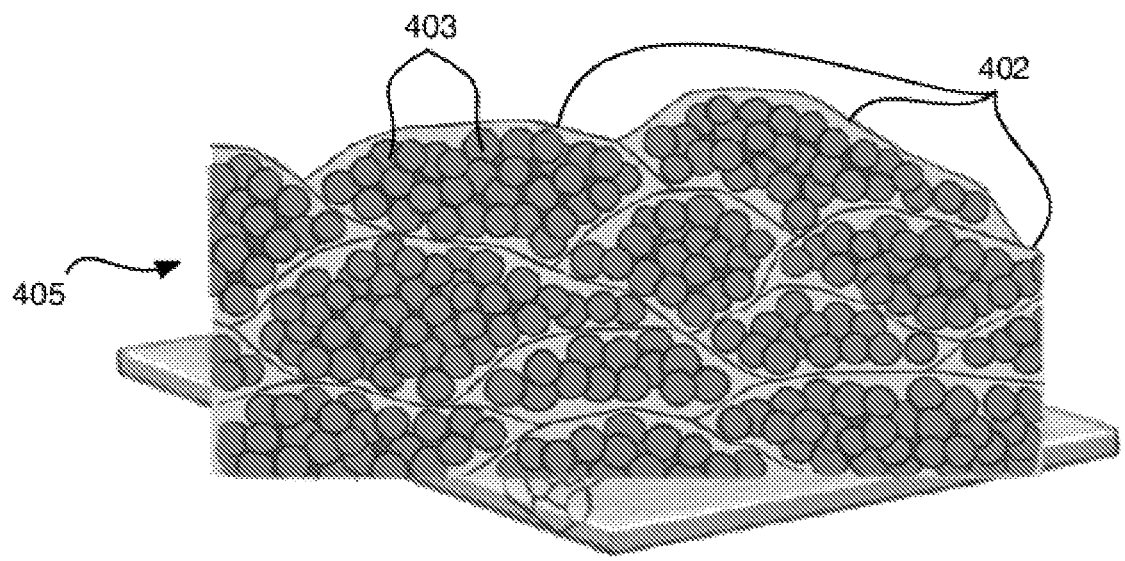
FIG. 4 shows an exemplary illustration of a plurality of graphenic inclusions (graphene components) collectively forming a graphenic web to secure nanostructures on a substrate.
Figure 5:
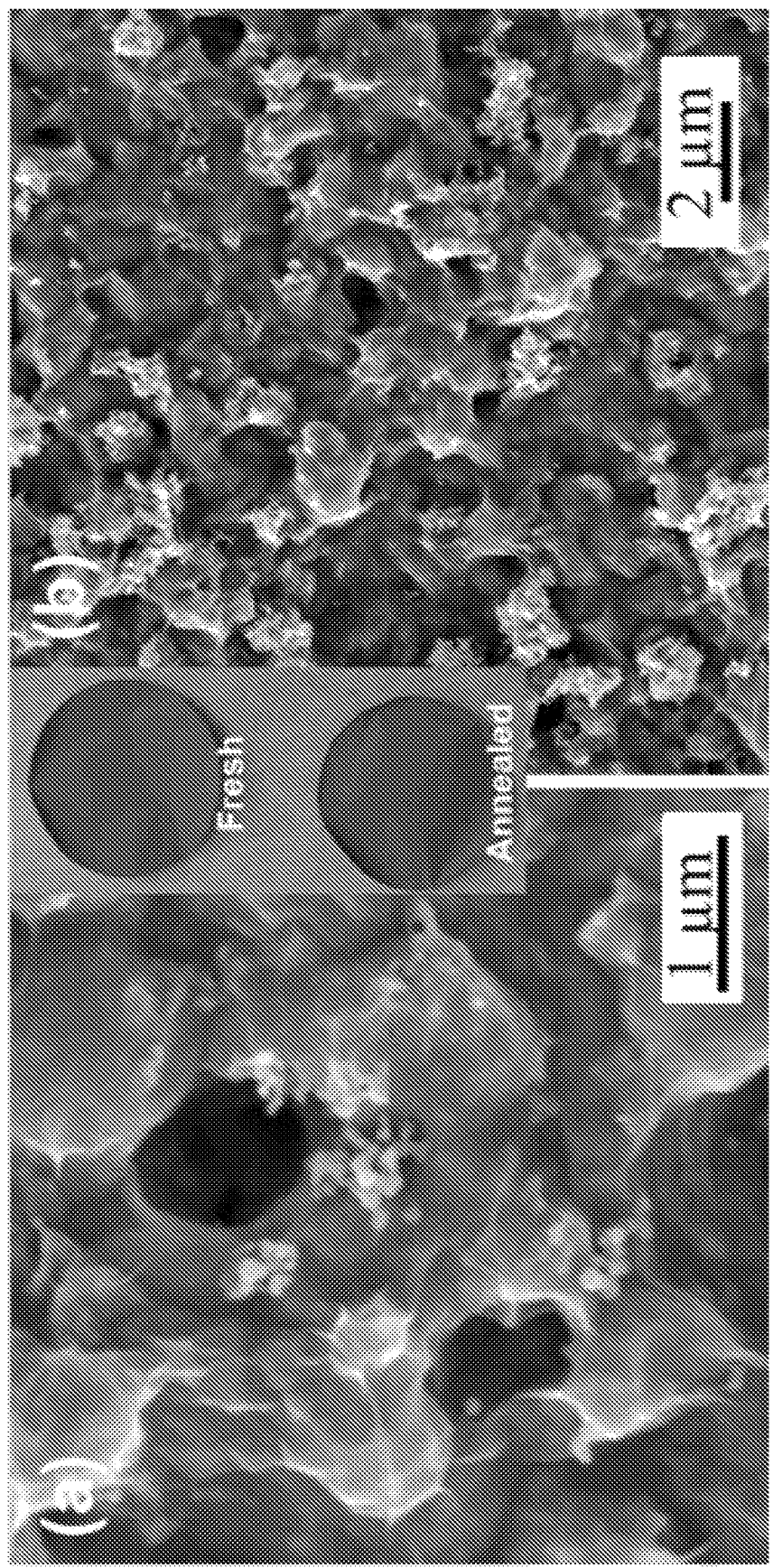
FIG. 5 illustrates exemplary microscopic images of exemplary graphenic webs securing active electrode components to a substrate.

In some instances, electrospray techniques (e.g., provided herein) facilitate the formation of high capacity electrodes, such as those described herein. FIG. 2 shows an exemplary illustration of a gas controlled electrospray system provided herein 200. In some embodiments, gas-controlled systems (and processes) provided herein provide electrospray (e.g., using $V_{DC}$ or $V_{AC}$) of a fluid stock with a gas (illustrated by the downward arrows) 201 (e.g., having a controlled flow, such as circumferentially configured with the dispensing of the fluid stock) from a nozzle 202 (e.g., coaxially arranged, as illustrated in FIG. 2). In some embodiments, with the flow of air, the droplets 203 proximal to the nozzle are smaller relative to non-gas controlled techniques (e.g., in some instances due to the controlled air flow at the nozzle end 204), and even smaller still as the droplets 205 move away from the nozzle toward the collector (droplets distal to the nozzle 206 and/or proximal to a collector 207). In some embodiments, such uniformity (e.g., uniformity of size, horizontal distribution, etc.) of dispersion of small droplets provides for a deposition 208 having a greatly improved uniformity of thickness, dispersion of inclusions, etc. As illustrated in FIG. 3, uniform dispersion of active materials and graphenic materials in a fluid stock and resulting electrospray plume facilitate the deposition of a graphenic material (e.g., graphene, GO, rGO sheet) 302 over a plurality of active material nanostructures 303, thereby facilitating the wrapping of the active material nanostructures 303 therein. As illustrated in FIG. 4, further deposition of graphenic materials 402 and active material nanostructures 403 provides a layered electrode structure 405 comprising a plurality of active material nanostructures 405 wrapped and/or secured within a web of the graphenic material 402. FIG. 5 illustrates images of exemplary electrodes provided herein comprising electrode active material wrapped within a graphenic web.

A fluid stock (e.g., for electrospraying) provided herein comprises any suitable components. In specific embodiments, the fluid stock comprises a liquid medium and an active electrode material. In specific embodiments, the fluid stock comprises a liquid medium, an active electrode material, and a graphenic material (e.g., a graphenic inclusion, such as a graphene component, described herein).

In some embodiments, the active electrode material is included in the form of or as a part of a particulate inclusion (e.g., nanoscaled—such as less than about 2 micron in at least one dimension—particulate; e.g., nanoparticles being less than about 2 micron in all dimensions, and nanorods and nanofibers being less than about 2 micron in diameter and greater or less than about 2 micron in a second dimension). In specific embodiments, nano-inclusions (e.g., nanoparticles) have nanoscale morphologies that are about 1 micron or less, about 500 nm or less, about 250 nm or less, or about 100 nm or less. In more specific embodiments, at least one dimension (e.g., all dimensions for a nanoparticle) is about 50 nm or less, or about 25 nm or less or about 10 nm or less, or about 5 nm to about 10 nm, or any other suitable size.

In certain embodiments, the active electrode material comprises a high energy capacity material (e.g., having a capacity of greater than graphite, such as >400 mAh/g, >500 mAh/g, >750 mAh/g, >1,000 mAh/g, or more). In some embodiments, the active electrode material comprises a material having high volume expansion upon lithiation (e.g., >150%, or >200%). In some instances, the active electrode material comprises Si, Ge, Sn, Co, Cu, Fe, any oxidation state thereof, or any combination thereof. In certain embodiments, the anode or high energy capacity material comprises Si, Ge, Sn, Al, an oxide thereof, a carbide thereof, or an alloy thereof. In specific embodiments, the anode or high energy capacity material comprises SiOx (e.g., wherein $0 \leq x \leq 2$, or $0 < x < 1.5$), $SiO_aN_bC_c$ (e.g., wherein $0 \leq a \leq 2$, $0 \leq 4/3$, and $0 \leq c \leq 1$, and, e.g., wherein a/2+3b/4+c is about 1 or less), Sn, SnOx (e.g., wherein $0 \leq x \leq 2$, or $0 < x < 1.5$), Si, Al, Ge, or an Si alloy.

In certain embodiments, the sulfur containing graphenic material is any suitable graphenic material, such as a nanostructured graphenic material. In some instances, the graphenic material is a graphenic sheet, a graphenic ribbon, or the like. In specific instances, the graphenic material is graphene, graphene oxide, reduced graphene oxide, or a combination thereof. In specific embodiments, the graphene oxide is a graphene functionalized with oxygen, such as with carbonyl groups, carboxyl groups (e.g., carboxylic acid groups, carboxylate groups, COOR groups, such as wherein R is a C1-C6 alkyl, or the like), —OH groups, epoxide groups, and/or the like. In some embodiments, reduced graphene oxide is a graphene (e.g., that retains various defects, such as comprising one or more opened internal rings, or the like) that is functionalized with oxygen, such as described for graphene oxides, and sulfur. Generally, reduced graphene oxide rGO is recognized as a graphene oxide material that has been partially or wholly reduced, such as by thermal (e.g., heating, such as to 200° C. or more), chemical (e.g., by treating with hydrazine, hydrogen plasma, urea, or the like), or other (e.g., using strong pulse light) mechanisms. In various embodiments, graphene oxide, or reduced graphene oxide provided herein comprises, e.g., about 60% or more carbon (e.g., 60% to 99%) and about 35% or less (e.g., 1% to 35%) oxygen, e.g., about 75% or more (e.g., 75% to 99%) carbon and about 25% or less (e.g., 1% to 25%) oxygen (e.g., as a weight %). In general embodiments, the total percentage of carbon and oxygen does not constitute 100% of the graphene analog, with the additional mass comprising any suitable atoms, including sulfur, and, e.g., hydrogen. In certain embodiments, a graphenic inclusion (e.g., graphene component) comprising sulfur facilitates securing (e.g., by bonding) of the graphenic inclusion/graphenic web to a substrate, such as a conductive substrate (e.g., current collector). In certain embodiments, a graphene oxide is utilized in the fluid stock and, following electrospraying of the fluid stock, the collected deposition is thermally treated (e.g., to a temperature of about 100° C. or more, e.g., about 150° C. to about 350° C., about 200° C. to about 300° C., about 200° C., about 250 ° C., or any suitable temperature), such as to at least partially reduce the graphene oxide (i.e., decrease the percentage of oxygen relative to carbon in the graphene oxide). In various other embodiments, any other suitable technique is optionally utilized to reduce the graphene oxide following deposition. In some instances, reduction of the graphene oxide following deposition improve the performance characteristics of the material (e.g., by, in some instances, increasing conductivity of the graphenic inclusion). For example, various figures provided herein illustrate that in some instances, materials provided herein demonstrate improved performance (e.g., specific capacity) characteristics with reduced graphene oxide (rGO), relative to graphene oxide (GO). However, in some instances, such as wherein water is utilized as the liquid medium of the fluid stock, it is preferred to utilize graphene oxide (GO), e.g., for its improved solubility/dispersability and facility in processing.

In certain embodiments, the liquid medium comprises any suitable solvent or suspending agent. In some embodiments, the liquid medium is merely utilized as a vehicle and is ultimately removed, e.g., by evaporation during the electrospraying process and/or upon drying of the deposition. In some embodiments, the liquid medium is aqueous. In specific embodiments, the liquid medium comprises water, alcohol ((e.g., n-, tert-, sec-, or iso-) butanol, (e.g., n-, or iso-) propanol, ethanol, methanol, or combinations thereof), tetrahydrofuran (THF), dimethylformamide (DMF), N-methyl-2-pyrrolidone (NMP), Dimethylacetamide (DMAc), or combinations thereof. In more specific embodiments, the liquid medium comprises water. In still more specific embodiments, the water is acidic (e.g., having a pH of less than 7, e.g., about 1 to about 5, or about 1 to about 4).

In some embodiments, an inclusion (e.g., in the fluid stock, droplets, and/or electrode or deposition) comprises a composite of an active electrode material. In specific embodiments the inclusion further comprises a second material (e.g., carbon, ceramic, or the like). In some embodiments, the inclusions are nanoscale inclusions, such as nanofibers, nanorods, or nanoparticles. In specific embodiments, the inclusion is a composite (e.g., nanofiber) comprising carbon and a silicon material (e.g., having the formula SiOx, wherein $0 \leq x \leq 2$, or other active silicon material, such as described herein). In certain embodiments, such materials are optionally manufactured according to any suitable technique, with exemplary techniques being described in U.S. patent application Ser. No. 14/382,423, entitled "Silicon Nanocomposite Nanofibers," U.S. patent application Ser. No. 14/457,994, entitled "Carbon and Carbon Precursors in Nanofibers," and U.S. Patent Application No. 62/111,908, entitled "Silicon-Carbon Nanostructured Composites," all of which are incorporated herein for the disclosure of such materials and methods of manufacturing such materials. For example, in certain embodiments, nanostructures comprising electrode active material provided herein are manufactured by dispersing silicon nanoparticles (i.e., nanoparticles comprising silicon, and, in some instances, oxides thereof) in a fluid stock (e.g., with a polymer and liquid medium), electrospinning (e.g., gas-assisted electrospinning) the fluid stock, carbonizing the product (e.g., nanofibers) thereof. In some embodiments, the inclusion is a carbon nanostructure (e.g., a carbon nanotube or a hollow carbon nanofiber) infused with a silicon material described herein (e.g., silicon or an SiOx material described herein).

Figure 6:
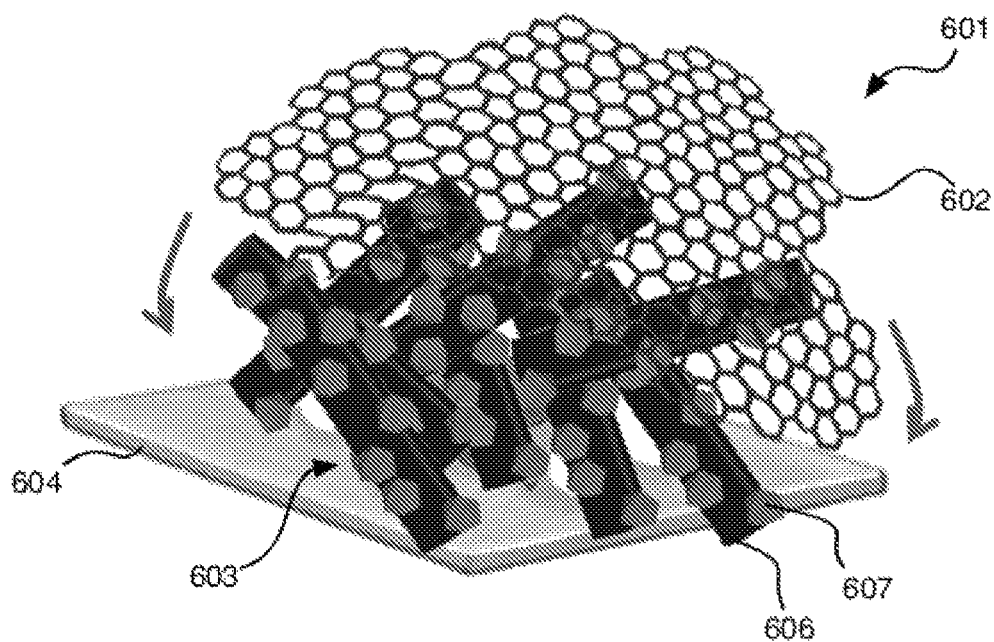
FIG. 6 illustrates an exemplary process of securing composite nanofibers (e.g., comprising a carbon matrix with electrode active material embedded therein) with a graphenic web comprising a graphene component.
Figure 7:
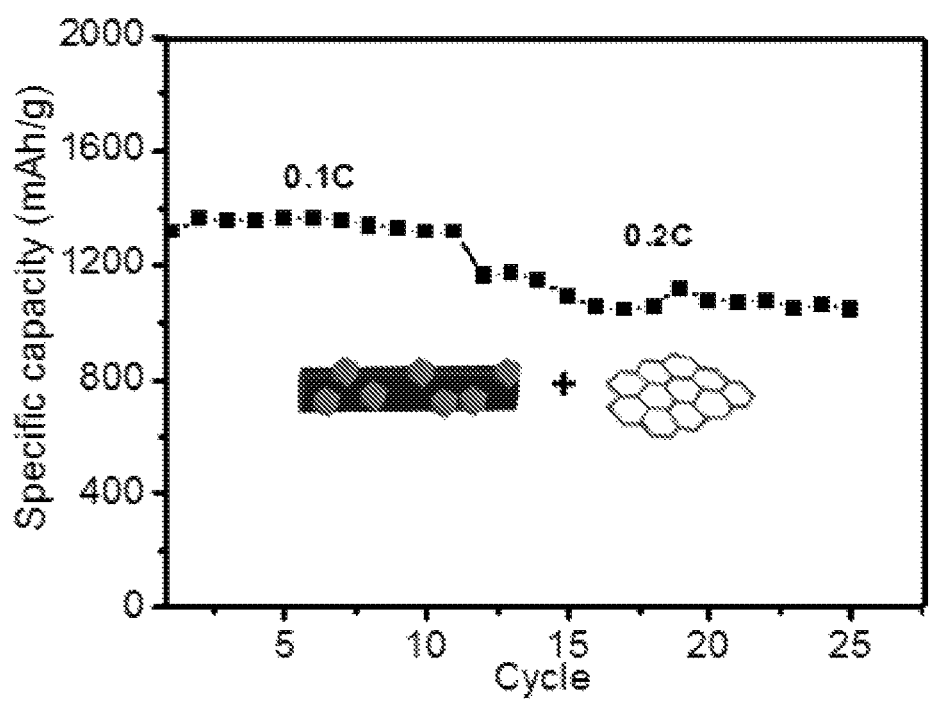
FIG. 7 illustrates exemplary specific capacity data for an exemplary electrode comprising composite nanofibers (comprising a carbon matrix with silicon nanoparticles embedded therein) secured on a current collector with a graphenic web comprising a graphene component.
Figure 17:
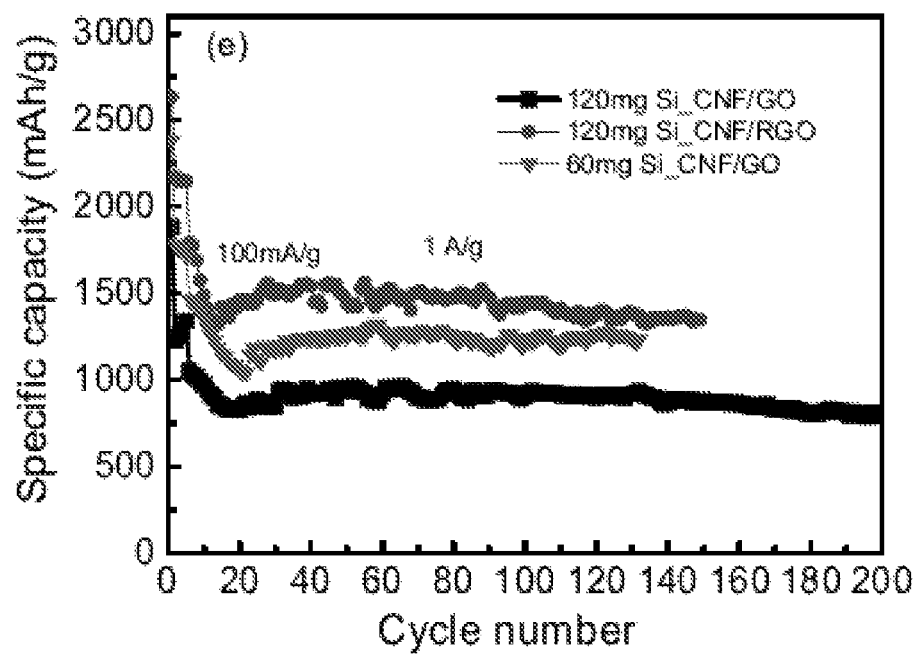
FIG. 17 illustrates exemplary specific capacity data for various exemplary electrodes provided herein comprising composite nanofibers (comprising a carbon matrix with silicon nanoparticles embedded therein) secured on a current collector with a graphenic web comprising a graphene component

FIG. 6 illustrates the inclusion of composite nanostructures (e.g., nanofibers) 603 comprising a matrix of carbon 606, with silicon inclusions (e.g., nanoparticles) 607 embedded therein, in a process and electrode/deposition 601 provided herein. As illustrated, a carbon web (e.g., comprising a carbon sheet) 602 secures the nanostructured inclusions (e.g., nanofibers) 603, such as to a current collector 604. FIG. 7 illustrates specific capacity data of such an exemplary material (e.g., a nanostructured (nanofiber) composite comprising SiOx domains (e.g., silicon nanoparticles) embedded therein). FIG. 17 illustrates additional specific capacity data for an exemplary material provided herein comprising a nanostructured (nanofiber) composite (e.g., comprising SiOx domains, such as silicon nanoparticles, embedded in a carbon matrix) with a carbon inclusion, including graphene oxide (GO) and reduced graphene oxide (rGO).

Figure 11:
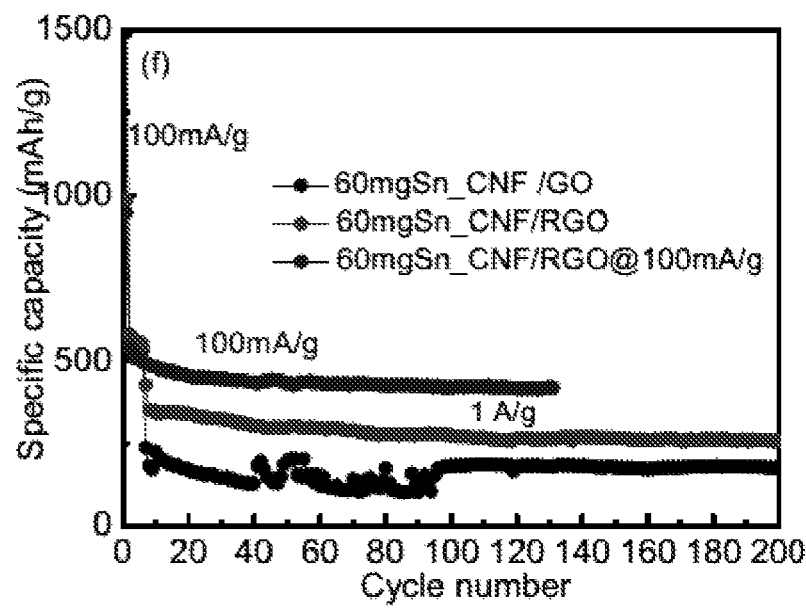
FIG. 11 illustrates exemplary specific capacity data for various exemplary electrodes provided herein comprising composite nanofibers (comprising a carbon matrix with tin embedded therein) secured on a current collector with a graphenic web comprising a graphene component.

FIG. 11 illustrates specific capacity data of another exemplary material (e.g., a nanostructured composite comprising Sn embedded within a carbon matrix). As is illustrated, high capacities and good cycling characteristics are demonstrated.

Figure 18:
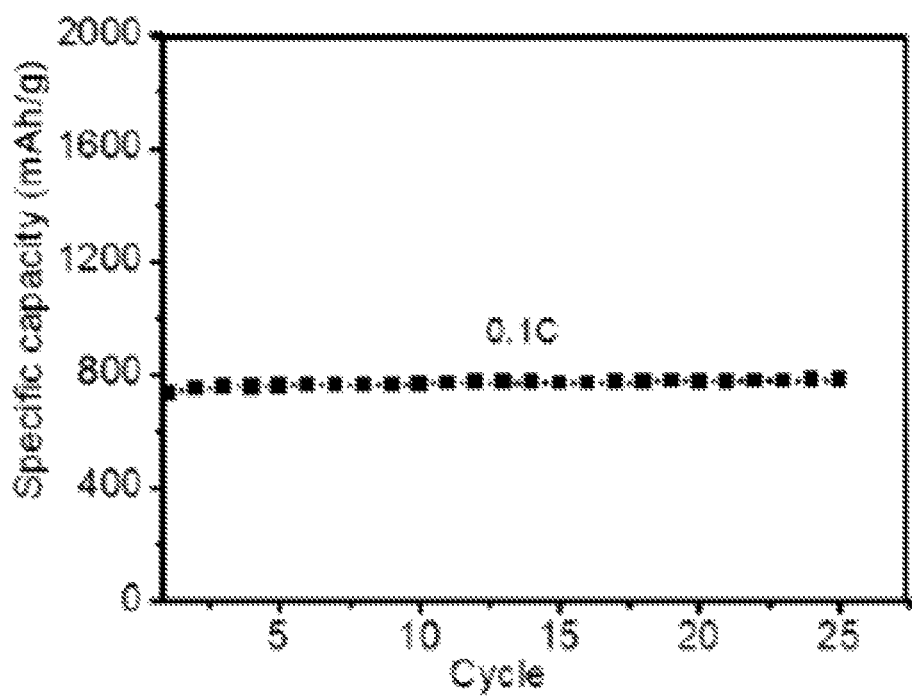
FIG. 18 illustrates exemplary specific capacity data for an exemplary electrode comprising nanostructures comprising SiOx secured on a current collector with a graphenic web comprising a graphene component.

In other exemplary embodiments, nanostructures comprising electrode active material provided herein are manufactured by dispersing a silicon precursor in a fluid stock (e.g., with a polymer and liquid medium/solvent), electrospinning (e.g., gas-assisted electrospinning) the fluid stock, and carbonizing the product (e.g., nanofibers) thereof (e.g., which, in some instances, also serves to calcine the silicon precursor to an active silicon material, such as having the SiOx or $SiO_aN_bC_c$ formula described herein). FIG. 18 illustrates specific capacity data in a full cell of an exemplary material (e.g., a nanostructured composite comprising SiOx embedded within a carbon matrix), e.g., prepared or preparable according to such techniques. As is illustrated, high capacities are demonstrated, with very good cycling characteristics.

In still other exemplary embodiments, nanostructures comprising electrode active material provided herein comprise nanostructures comprising or of the electrode active material. In various instances, such materials are manufactured for the purpose of including in such an electrode or deposition, or are used from commercial sources.

Figure 9:
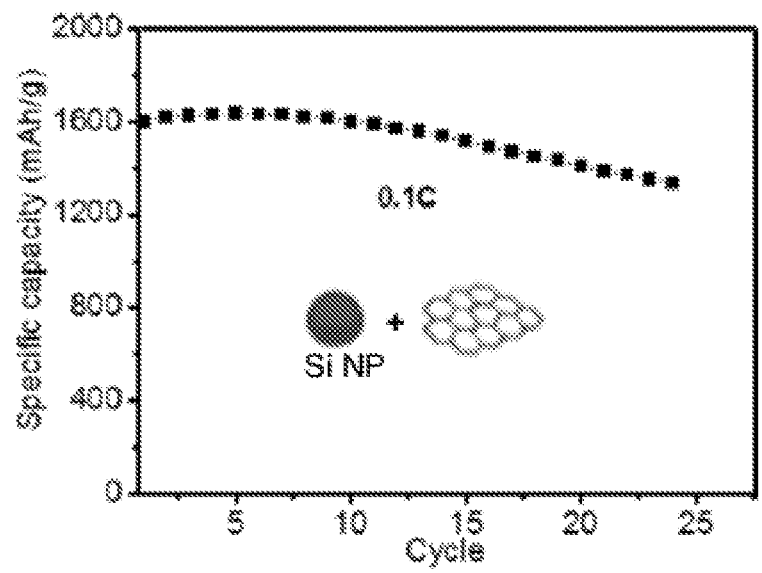
FIG. 9 illustrates exemplary specific capacity data for an exemplary electrode comprising silicon nanoparticles secured on a current collector with a graphenic web comprising a graphene component.
Figure 15:
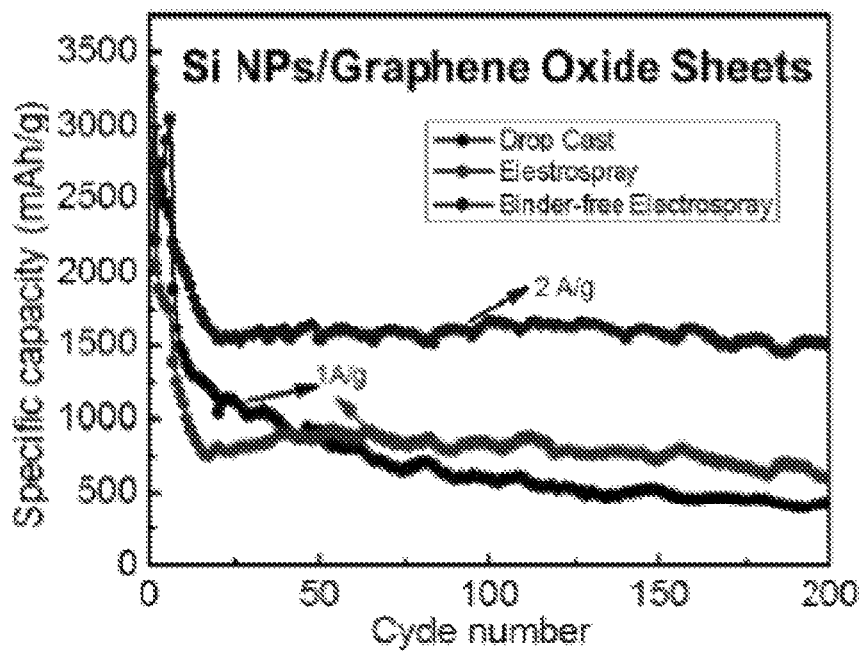
FIG. 15 illustrates exemplary specific capacity data for a lithium ion battery negative electrode comprising silicon nanoparticles secured on a current collector with a graphenic web comprising a graphene component compared to other lithium ion battery negative electrodes comprising silicon nanoparticles and a graphene component.
Figure 16:
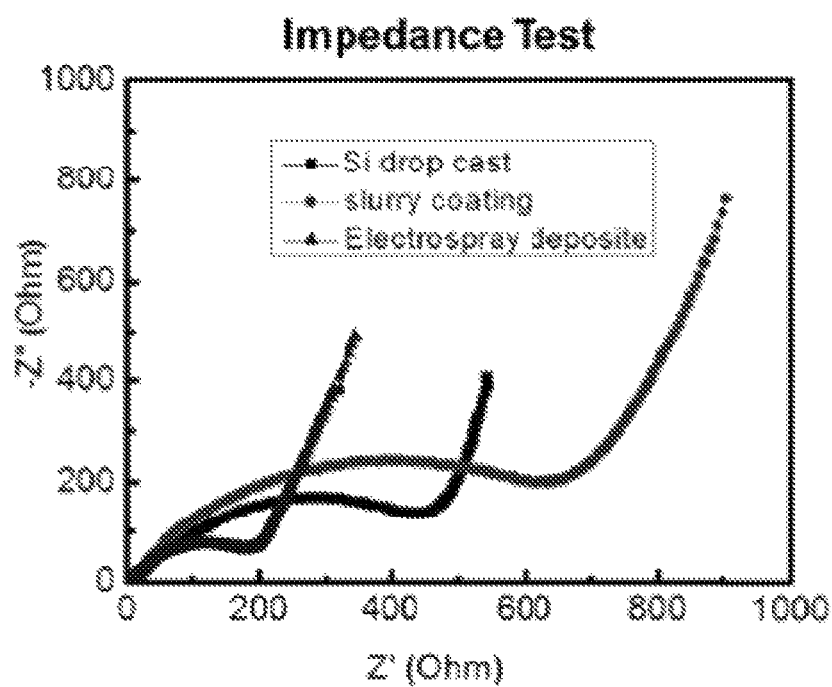
FIG. 16 illustrates exemplary impedance data for various electrodes.

In specific embodiments, a nanostructure comprising electrode active material provided herein is a nanoparticle comprising an active silicon material, such as SiOx (e.g., as described herein). In specific embodiments, the active silicon material is silicon (Si). In some embodiments, the nanostructures are silicon nanoparticles. FIG. 9 illustrates specific capacity data in a full cell using silicon nanoparticles (as nanostructures comprising electrode active material) and graphene oxide (as graphenic inclusion material). As is illustrated, high capacities are demonstrated, with good cycling characteristics. FIG. 15 illustrates specific capacity data of exemplary materials and comparative materials (electrode prepared by drop casting) comprising nanostructures comprising electrode active material (e.g., silicon nanoparticles) and graphenic inclusions (e.g., graphene oxide sheets). As illustrated, even at a higher charge rate, negative electrode materials prepared according to processes described herein have a much higher specific capacity than electrode materials prepared utilizing drop cast techniques, but otherwise comprising similar component parts. In addition, as illustrated, even at a higher charge rate, negative electrode materials prepared according to processes described herein have a much higher specific capacity than electrode materials prepared utilizing non-gas controleld electrospray techniques, but otherwise comprising similar component parts. Further, in some instances—as illustrated, the materials provided herein have greatly improved capacity retention over electrode materials prepared using drop cast and non-gas controlled electrospray techniques. FIG. 16 illustrates improved impedance values for anodes prepared according to the instant techniques (e.g., gas controlled electrospray) compared to other anodes prepared using similar components.

Figure 10:
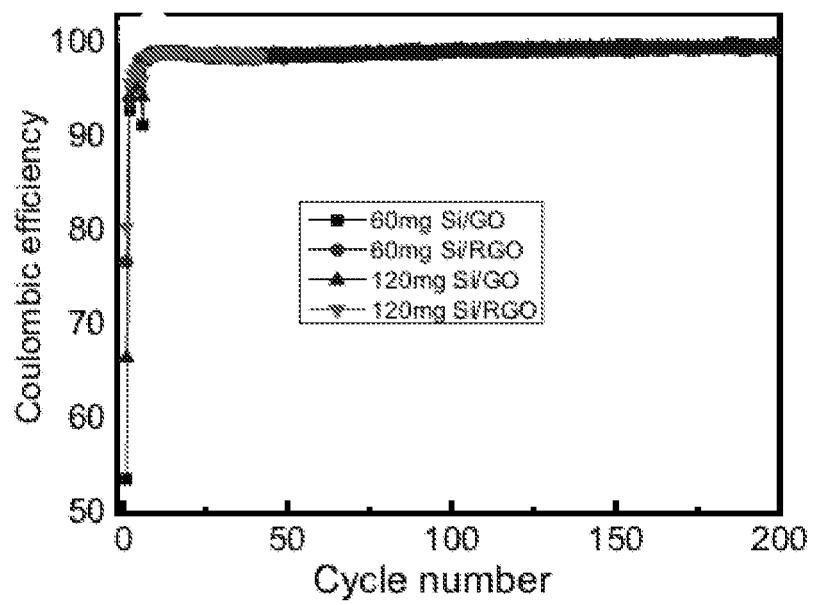
FIG. 10 illustrates exemplary Coulombic efficiency data for various exemplary electrodes comprising silicon nanoparticles secured on a current collector with a graphenic web comprising a graphene component.
Figure 12:
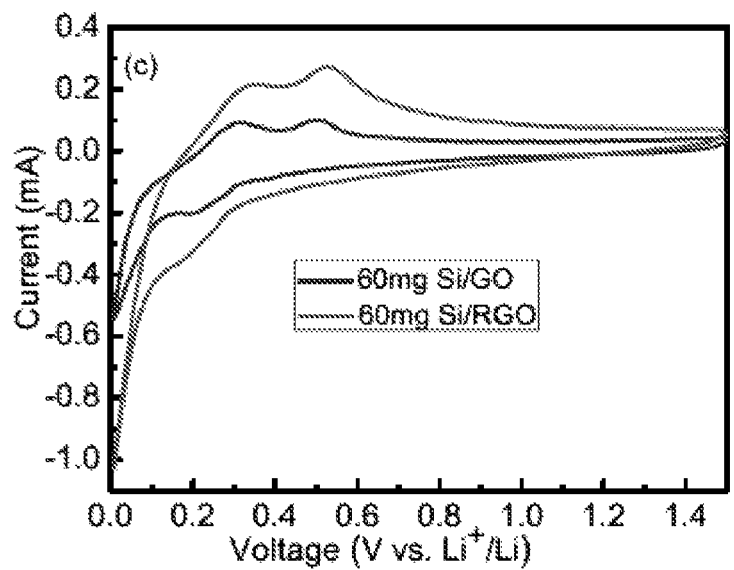
FIG. 12 illustrates exemplary cyclic voltammetry (CV) curves for various exemplary electrodes comprising silicon nanoparticles secured on a current collector with a graphenic web comprising a graphene component.

FIG. 10 illustrates Coulombic efficiency values of exemplary lithium ion battery negative electrodes (anodes) provided herein, using silicon nanoparticles and various graphenic inclusions (e.g., graphene oxide and reduced graphene oxide). As is illustrated, materials provided herein demonstrate good Coulombic efficiency. FIG. 12 illustrates cyclic voltammetry (CV) curves of direct deposited silicon nanoparticles and graphene oxide or reduced graphene oxide on an electrode.

Figure 13:
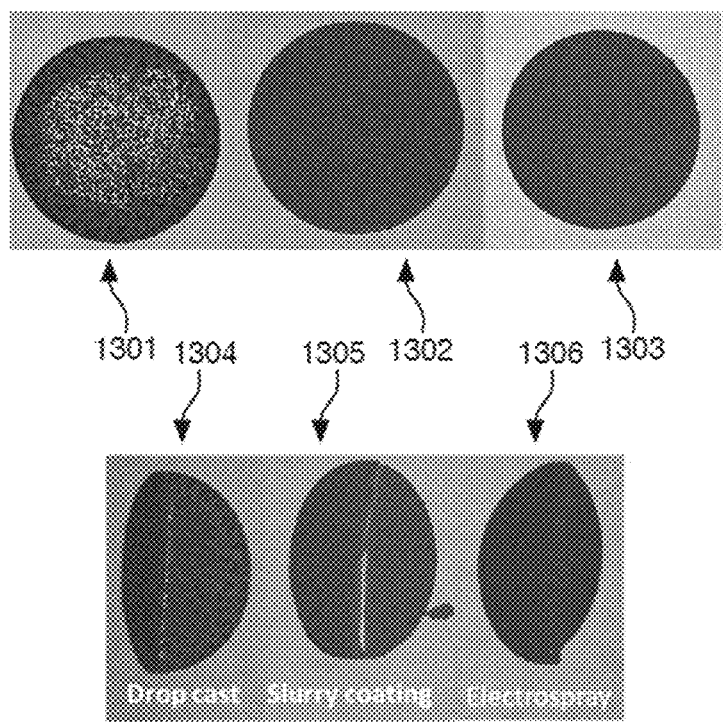
FIG. 13 shows images of substrates coated with an active material and a graphenic inclusion, using various techniques, including exemplary techniques described herein.
Figure 14:
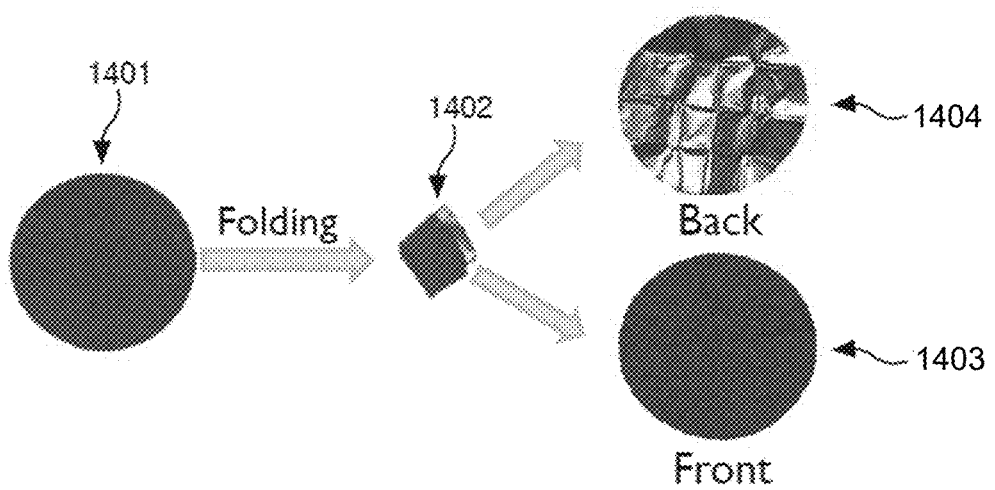
FIG. 14 shows images of substrates coated with an active material and a graphenic inclusion using exemplary techniques described herein, and illustrative effects of folding such coated substrates.

In certain embodiments, provided herein is a thin layer electrode (e.g., comprising an electrode material provided herein) deposited on a current collector. In some embodiments, the electrode is well adhered to the current collector. In specific embodiments, the electrode is adheres to the current collector such that after at least two times (e.g., at least three times, at least five times, or the like) folding the electrode/current collector at an angle of at least 90 degrees (e.g., at least 135 degrees), there is less than 10% (e.g., less than 5%, less than 3%, less than 1%, or the like) exfoliation of the electrode (e.g., wherein the exfoliation is the % separation of the electrode from the current collector, e.g., by area). FIG. 13 shows images of various current collectors coated with a nanostructure electrode active material and a graphenic inclusion, such as those described herein. Illustrated is an electrode deposited onto the current collector using drop cast techniques 1301, slurry coating/doctor blade techniques 1302, and electrospray techniques 1303 described herein, with each being folded 1304, 1305, 1306. As illustrated, in some instances, provided herein are electrodes having smooth and/or uniform surfaces, with good coverage compared, e.g., to drop casting, which has poor coverage and exfoliation upon folding, as illustrated in FIG. 14. FIG. 14 shows images of an electrode deposited onto the current collector using electrospray techniques 1401, and being repeatedly folded 1402, and unfolded, with both front 1403 and back 1404 images. As is illustrated, in some embodiments, despite heavy folding, the electrode retains its structure well, with minimal or no exfoliation.

In some embodiments, relatively small amounts of graphenic inclusion are required to form a graphenic web, securing the active material of the electrode material and/or electrode. In certain instances, such low graphenic loading requirements, provide for very high capacities of the overall electrode, not just high capacities of the active material of the electrode. Further, with the inclusion of the graphenic inclusion configured to secure the active material (e.g., to the current collector), the electrode comprises very high concentrations of active material and, e.g., does not require the use of additional binders (e.g., forming a binder-free electrode), fillers, or the like. In some instances, such high concentrations of active electrode material in the electrode and/or electrode material provided herein allows for the manufacture of electrodes having the desired capacities while using very little material. In some instances, processes provided herein are well designed to not only manufacture high capacity materials, but to also manufacture thin electrode materials having very good uniformity and very low defect characteristics (e.g., which defects may result in reduced capacity upon cycling).

In some embodiments, the graphenic inclusion comprises about 20 wt % or less (e.g., about 10 wt % or less, about 5 wt % or less, or about 0.5 wt % to about 3 wt %) of the deposition, or about 20 wt % or less (e.g., about 10 wt % or less, about 5 wt % or less, or about 0.5 wt % to about 3 wt %) of the additives of the fluid stock (i.e., of the non-liquid medium components of the fluid stock).

In some embodiments, the weight ratio of nanostructures comprising active material to graphenic inclusion (e.g., in a fluid stock, deposition, and/or material provided herein) is about 8:2 to about 999:1, e.g., about 85:15 to about 995:5, about 9:1 to about 99:1. In certain embodiments, the percentage of nanostructures comprising active material in the electrode or electrode material is about 25 wt % or more, e.g., about 50 wt % or more, about 75 wt % or more, about 80 wt % or more, about 85 wt % or more, about 90 wt % or more, about 95 wt % or more, or the like. Further, in some embodiments, the amount of active material in the electrode or electrode material is about 20 wt % or more, e.g., about 40 wt % or more, about 50 wt % or more, about 60 wt % or more, about 70 wt % or more, about 80 wt % or more, about 90 wt % or more, or the like.

Any suitable amount of electrode active material is included in a fluid stock provided herein. In specific embodiments, the concentration of the electrode active material and/or nanostructured inclusions comprising the electrode active material provided in the fluid stock is about 0.05 wt % or more, e.g., about 0.1 wt % to about 25 wt %, about 0.2 wt % to about 10 wt %, about 0.5 wt % to about 5 wt %, about 1 wt % to about 3 wt %, about 2 wt %, or the like).

In certain embodiments, the electrode is a thin layer electrode (e.g., deposited on a current collector). In specific embodiments, the electrode has a thickness of about 500 microns or less, e.g., about 250 microns or less, about 200 microns or less, about 25 microns to about 500 microns, about 50 microns to about 200 microns, or the like. In some embodiments, the electrode has a mass loading on a substrate of about 10 $mg/cm^2$ or less, such as about 0.1 $mg/cm^2$ to about 10 $mg/cm^2$, about 5 $mg/cm^2$ or less, about 4 $mg/cm^2$ or less, about 3 $mg/cm^2$ or less, about 1 $mg/cm^2$ to about 2 $mg/cm^2$.

In various embodiments, the current collector is any suitable material, such as a metal (e.g., aluminum, copper, or the like) (such as a metal foil) or a carbon substrate (e.g., carbon cloth, carbon paper, or the like). In certain embodiments, a carbon substrate provides improved flexibility to the combined electrode and current collector product.

In various embodiments, electrode materials and electrodes provided herein have high capacities (e.g., specific capacities in a lithium ion cell, such as a half cell or full cell). In specific embodiments, the electrode material and/or electrode has a specific capacity of about 500 mAh/g or more at a charge rate of about 1 A/g. In more specific embodiments, the electrode material and/or electrode has a specific capacity of about 600 mAh/g or more at a charge rate of about 1 A/g. In still more specific embodiments, the electrode material and/or electrode has a specific capacity of about 700 mAh/g or more at a charge rate of about 1 A/g. In yet more specific embodiments, the electrode material and/or electrode has a specific capacity of about 800 mAh/g or more at a charge rate of about 1 A/g. In more specific embodiments, the electrode material and/or electrode has a specific capacity of about 1000 mAh/g or more (e.g., about 1100 mAh/g or more, or about 1200 mAh/g or more) at a charge rate of about 1 A/g. In some embodiments, the electrode material and/or electrode has a specific capacity of about 500 mAh/g or more at a charge rate of about 2 A/g. In more specific embodiments, the electrode material and/or electrode has a specific capacity of about 600 mAh/g or more at a charge rate of about 2 A/g. In still more specific embodiments, the electrode material and/or electrode has a specific capacity of about 700 mAh/g or more at a charge rate of about 2 A/g. In yet more specific embodiments, the electrode material and/or electrode has a specific capacity of about 800 mAh/g or more at a charge rate of about 2 A/g. In more specific embodiments, the electrode material and/or electrode has a specific capacity of about 1000 mAh/g or more (e.g., about 1100 mAh/g or more, or about 1200 mAh/g or more) at a charge rate of about 2 A/g. In certain embodiments, such capacities are observed on the initial cycle (charge and/or discharge cycle), on or after the $5^{th}$ cycle, on or after the $10^{th}$ cycle, on or after the $50^{th}$ cycle, on or after the $100^{th}$ cycle, on or after the $150^{th}$ cycle, on or after the $200^{th}$ cycle, on or after the $250^{th}$ cycle, or a combination thereof. In certain embodiments, the specific capacity of the electrode material and/or electrode on or after the $200^{th}$ and/or $250^{th}$ cycle (e.g., charge and/or discharge cycle) is about 80% or more (e.g., 85% or more) of the specific capacity of the electrode material and/or electrode on the $1^{st}$ cycle, the $5^{th}$ cycle, and/or the $10^{th}$ cycle.

In a process for manufacturing an electrode according to one embodiment of the invention, the fluid stock comprising a nanostructured inclusion, a graphenic inclusion, and water may be formed by mixing a (dispersed) solution comprising the graphenic inclusion and water with the nanostructured inclusion comprising a silicon or tin active material.

In one example, the graphenic inclusion in the (dispersed) solution may be a graphene component containing a sulfur atom or a sulfur containing compound (e.g., a graphenic inclusion comprising sulfur atoms). The graphene component may be selected from the group consisting of (sulfur modified) graphene oxide, reduced graphene oxide, graphene, and a combination thereof.

Further, the (dispersed) solution may comprise the graphene component in an amount of 1 to 5% by weight and the water in an amount of 95 to 99% by weight. The sulfur atom or the sulfur containing compound may be on the surface of the graphene component, and may be contained in an amount of 0.005 to 0.1% by weight based on the amount of the (dispersed) solution. Further, the (dispersed) solution may have pH value of 2 to 4. Specifically, the graphene component may contain 0.5 to 1% by weight of the sulfur atom or the sulfur containing compound on its surface, based on the amount of the carbon atom contained therein.

In some embodiments, in an electrode provided herein, the sulfur atom or the sulfur containing compound on the graphenic inclusion may be bonded to a conductive substrate (e.g., a current collector, such as described herein). In some instances, in the electrode, the adhesion between the layer comprising the graphene component and the conductive substrate (e.g., metal foil) can be improved by the sulfur containing bonding. In certain instances, if the amount of the sulfur is too small, the layer comprising the nanostructured inclusions and the graphene component may show an inferior adhesion to the conductive substrate (e.g., metal foil) in the electrode prepared by the embodiment of the invention, and the electrode may have a poor folding property. In some instances, if the amount of the sulfur is too large, the conductive substrate (e.g., metal foil) can be oxidized, and the properties of the electrode can deteriorate.

In some instances, if the amount of the graphene component in the (dispersed) solution is too small, the nanostructured inclusions (e.g., silicon active material) cannot be effectively wrapped with the graphenic web comprising the graphene component in the electrode. Thus, in some of such instances, the properties of the electrode can deteriorate. In certain instances, if the amount of the graphene component in the (dispersed) solution is too large, the viscosity of the (dispersed) solution may be too high, and thus the (dispersed) solution and the fluid stock prepared therefrom are difficult to be coated on the conductive substrate.

In some embodiments, provided herein is a process for producing a materials and electrodes provided herein (e.g., a thin layer depositions thereof), the process comprising electrospraying a fluid stock provided herein with a gas (e.g., a controlled gas flow). In certain embodiments, the fluid and the gas are ejected from an electrospray nozzle in a similar direction. In some instances, the direction of ejection of the fluid stock and the gas from the electrospray nozzle is within about 30 degrees of one another, or, more preferably within about 15 degrees of one another (e.g., within about 10 degrees or within about 5 degrees of one another). In certain embodiments, the fluid stock and the gas are configured to be ejected from the nozzle in a coaxial configuration. In some instances, configurations and processes described herein allow for an enhanced driving force of electrospray, combining the driving forces of electric field gradient with high speed gas. In certain instances, configurations and processes described herein provided for several improvements in material characteristics described herein, such as illustrated by the figures.

In some instances, electrospray (e.g., using a process and/or system provided herein) of the fluid stock results in the formation of a jet, which subsequently deforms into a plume comprising a plurality of droplets. In certain instances, electrospray (e.g., using a process and/or system provided herein) of a fluid stock, such as provided herein results in the formation of a plume comprising a plurality of droplets (collectively referred to herein so as to encompass, e.g., droplet solutions, droplet suspensions, and/or solid particles in an electrospray plume). In some instances, the processes described herein results in the formation of small droplets (e.g., nanoscale droplets) having highly uniform size distributions.

In certain embodiments, a process provided herein comprises producing an electrostatically charged plume comprising a plurality of particles and/or droplets (e.g., an area or section of air comprising a plurality of particles and/or droplets dispersed therein). In specific embodiments, the plurality of particles and/or droplets are nanoscaled particles and/or droplets. In more specific embodiments, the plurality of particles and/or droplets have an average diameter of about 10 microns or less. In still more specific embodiments, the plurality of particles and/or droplets have an average diameter of about 5 microns or less, e.g., about 1 micron or less. In certain embodiments, the size of the particles and/or droplets is highly uniform, with the standard deviation of the particle and/or droplet size being about 50% of the average size of the particles and/or droplets, or less (e.g., about 40% or less, about 30% or less, about 20% or less, about 10% or less, or the like) (e.g., at any given distance from the nozzle, e.g., about 10 cm or more, about 15 cm or more, about 20 cm or more, about 25 cm or more, from the nozzle).

In specific embodiments, the plume (e.g., particles and/or droplets thereof) comprise a polymer and/or a plurality of additive particles (e.g., nanoparticles). In certain embodiments, the plume (e.g., particles and/or droplets thereof) further comprises a liquid medium (e.g., wherein the liquid medium of a fluid stock is not completely evaporated). In some instances, the controlled air flow allows for a increase rate and uniformity in dispersion and breaking up of the jet and the plume, allowing for increased fluid stock flow rates, while also increasing deposition uniformity and performance characteristics. In certain embodiments, the fluid stock is provided to the first inlet at a rate (e.g., where a direct current voltage ($V_{DC}$) is applied to the electrospray system) of about 0.01 to about 10 mL/min, e.g., about 0.05 mL/min to about 5 mL/min, or about 0.5 mL/min to about 5 mL/min. In some instances, use of alternating current configurations (e.g., wherein an alternating current voltage ($V_{AC}$) is applied to the electrospray system) allow for higher throughput. In certain embodiments, the fluid stock is provided to the first inlet at a rate of about 0.1 mL/min or more, e.g., about 0.1 mL/min to about 25 mL/min, about 0.3 mL/min or more, about 0.5 mL/min or more, about 1 mL/min or more, about to about 2.5 mL/min, or about 5 mL/min or more.

In specific embodiments, an process described herein comprises providing a fluid stock to a first inlet of a first conduit of an electrospray nozzle, the first conduit being enclosed along the length of the conduit by a wall having an interior surface and an exterior surface, the first conduit having a first outlet. In specific instances, the walls of the first conduit form a capillary tube, or other structure. In some instances, the first conduit is cylindrical, but embodiments herein are not limited to such configurations.

Figure 8:
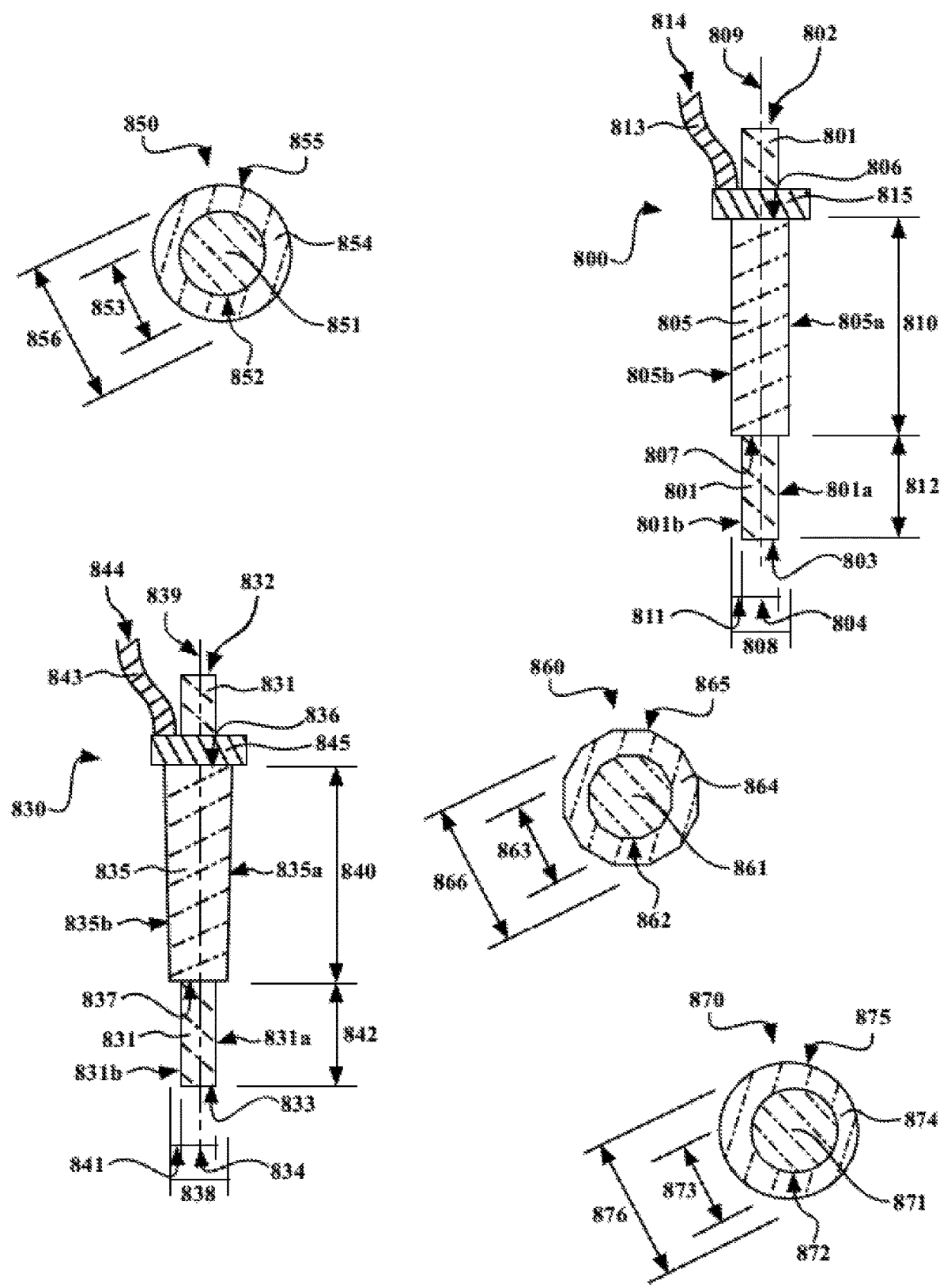
FIG. 8 illustrates exemplary electrospray nozzle apparatuses utilized to manufacture certain electrodes and electrode materials provided herein.

FIG. 8 illustrates exemplary electrospray nozzle apparatuses 800 and 830 provided herein. Illustrated by both nozzle components 800 and 830 some embodiments, the nozzle apparatus comprises a nozzle component comprising a first (inner) conduit, the first conduit being enclosed along the length of the conduit by a first wall 801 and 831 having an interior and an exterior surface, and the first conduit having a first inlet (or supply) end 802 and 832 (e.g., fluidly connected to a first supply chamber and configured to receive a fluid stock) and a first outlet end 803 and 833. Generally, the first conduit has a first diameter 804 and 834 (e.g., the average diameter as measured to the inner surface of the wall enclosing the conduit). In further instances, the nozzle component comprising a second (outer) conduit, the second conduit being enclosed along the length of the conduit by a second wall 805 and 835 having an interior and an exterior surface, and the second conduit having a second inlet (or supply) end 806 and 836 (e.g., fluidly connected to a second supply chamber and configured to receive a gas—such as a high velocity or pressurized gas (e.g., air)) and a second outlet end 807 and 837. In some instances, the second inlet (supply) end 806 and 836 is connected to a supply chamber. In certain instances, the second inlet (supply) end 806 and 836 are connected to the second supply chamber via a supply component. FIG. 8 illustrates an exemplary supply component comprising a connection supply component (e.g., tube) 813 and 843 that fluidly connects 814 and 844 the supply chamber (not shown) to an inlet supply component 815 and 845, which is fluidly connected to the inlet end of the conduit. The figure illustrates such a configuration for the outer conduit, but such a configuration is also contemplated for the inner and any intermediate conduits as well. Generally, the first conduit has a first diameter 808 and 838 (e.g., the average diameter as measured to the inner surface of the wall enclosing the conduit). The first and second conduits have any suitable shape. In some embodiments, the conduits are cylindrical (e.g., circular or elliptical), prismatic (e.g., a octagonal prism), conical (e.g., a truncated cone—e.g., as illustrated by the outer conduit 835) (e.g., circular or elliptical), pyramidal (e.g., a truncated pyramid, such as a truncated octagonal pyramid), or the like. In specific embodiments, the conduits are cylindrical (e.g., wherein the conduits and walls enclosing said conduits form needles). In some instances, the walls of a conduit are parallel, or within about 1 or 2 degrees of parallel (e.g., wherein the conduit forms a cylinder or prism). For example, the nozzle apparatus 800 comprise a first and second conduit having parallel walls 801 and 805 (e.g., parallel to the wall on the opposite side of the conduit, e.g., as illustrated by 801*a*/801*b* and 805*a*/805*b*, or to a central longitudinal axis 809). In other embodiments, the walls of a conduit are not parallel (e.g., wherein the diameter is wider at the inlet end than the outlet end, such as when the conduit forms a cone (e.g., truncated cone) or pyramid (e.g., truncated pyramid)). For example, the nozzle apparatus 830 comprise a first conduit having parallel walls 831 (e.g., parallel to the wall on the opposite side of the conduit, e.g., as illustrated by 831*a*/831*b*, or to a central longitudinal axis 839) and a second conduit having non-parallel walls 835 (e.g., not parallel or angled to the wall on the opposite side of the conduit, e.g., as illustrated by 835*a*/835*b*, or to a central longitudinal axis 839). In certain embodiments, the walls of a conduit are within about 15 degrees of parallel (e.g., as measured against the central longitudinal axis, or half of the angle between opposite sides of the wall), or within about 10 degrees of parallel. In specific embodiments, the walls of a conduit are within about 5 degrees of parallel (e.g., within about 3 degrees or 2 degrees of parallel). In some instances, conical or pyramidal conduits are utilized. In such embodiments, the diameters for conduits not having parallel walls refer to the average width or diameter of said conduit. In certain embodiments, the angle of the cone or pyramid is about 15 degrees or less (e.g., the average angle of the conduit sides/walls as measured against a central longitudinal axis or against the conduit side/wall opposite), or about 10 degrees or less. In specific embodiments, the angle of the cone or pyramid is about 5 degrees or less (e.g., about 3 degrees or less). Generally, the first conduit 801 and 831 and second conduit 805 and 835 having a conduit overlap length 810 and 840, wherein the first conduit is positioned inside the second conduit (for at least a portion of the length of the first and/or second conduit). In some instances, the exterior surface of the first wall and the interior surface of the second wall are separated by a conduit gap 811 and 841. In certain instances, the first outlet end protrudes beyond the second outlet end by a protrusion length 812 and 842. In certain instances, the ratio of the conduit overlap length-to-second diameter is any suitable amount, such as an amount described herein. In further or alternative instances, the ratio of the protrusion length-to-second diameter is any suitable amount, such as an amount described herein, e.g., about 1 or less.

FIG. 8 also illustrates cross-sections of various nozzle components provided herein 850, 860 and 870. Each comprises a first conduit 851, 861 and 871 and second conduit 854, 864, and 874. As discussed herein, in some instances, the first conduit is enclosed along the length of the conduit by a first wall 852, 862 and 872 having an interior and an exterior surface and the second conduit is enclosed along the length of the conduit by a second wall 855, 865 and 875 having an interior and an exterior surface. Generally, the first conduit has any suitable first diameter 853, 863 and 864 and any suitable second diameter 856, 866, and 876. The cross-dimensional shape of the conduit is any suitable shape, and is optionally different at different points along the conduit. In some instances, the cross-sectional shape of the conduit is circular 851/854 and 871/874, elliptical, polygonal 861/864, or the like.

In some instances, coaxially configured nozzles provided herein and coaxial gas controlled electrospraying provided herein comprises providing a first conduit or fluid stock along a first longitudinal axis, and providing a second conduit or gas (e.g., pressurized or high velocity gas) around a second longitudinal axis (e.g., and electrospraying the fluid stock in a process thereof). In specific embodiments, the first and second longitudinal axes are the same. In other embodiments, the first and second longitudinal axes are different. In certain embodiments, the first and second longitudinal axes are within 500 microns, within 100 microns, within 50 microns, or the like of each other. In some embodiments, the first and second longitudinal axes are aligned within 15 degrees, within 10 degrees, within 5 degrees, within 3 degrees, within 1 degree, or the like of each other. For example, FIG. 8 illustrates a cross section of a nozzle component 870 having an inner conduit 871 that is off-center (or does not share a central longitudinal axis) with an outer conduit 874. In some instances, the conduit gap (e.g., measurement between the outer surface of the inner wall and inner surface of the outer wall) is optionally averaged—e.g., determined by halving the difference between the diameter of the inner surface of the outer wall 876 and the diameter of the outer surface of the inner wall 872. In some instances, the smallest distance between the inner surface of the outer wall 876 and the diameter of the outer surface of the inner wall 872 is at least 10% (e.g., at least 25%, at least 50%, or any suitable percentage) of the largest distance between the inner surface of the outer wall 876 and the diameter of the outer surface of the inner wall 872.

In some embodiments, the fluid stock has any suitable viscosity. In addition, the process and systems described herein allow for the electrospray manufacture of depositions using highly viscous (and, e.g., highly loaded) fluid stocks, if desired. For example, in some embodiments, fluid stocks utilized in systems and processes herein have a viscosity of about 0.5 centipoise (cP) or more, e.g., about 5 cP or more, or about 1 cP to about 10 Poise. In more specific embodiments, the viscosity is about 10 cP to about 10 Poise.

In some embodiments, a process herein comprises or a system provided herein is configured to provide a voltage (e.g., $V_{DC}$ or $V_{AC}$) to an electrospray nozzle, such as one provided herein. In specific embodiments, the voltage is provided to the inner conduit (e.g., the walls thereof). In certain embodiments, application of the voltage to the nozzle provides an electric field at the nozzle (e.g., at the outlet of the inner conduit thereof). In some instances, the electric field results in the formation of a "cone" (e.g., Taylor cone) at the nozzle (e.g., at the outlet of the inner conduit thereof), and ultimately a jet and/or a plume. In certain instances, after the formation of a cone, the jet and/or plume is broken up into small and highly charged liquid droplets (or particles), which are dispersed, e.g., due to Coulomb repulsion. As used herein, droplets and particles are referred to interchangeably, wherein the particles comprise droplets (e.g., comprising a liquid medium of the fluid stock) or dried particles (e.g., wherein the liquid medium of the fluid stock has been evaporated during the electrospray process).

In some embodiments, any suitable voltage (e.g., direct or alternating current voltage) is applied (e.g., to the nozzle). In specific embodiments, the voltage applied is about 8 $kV_{DC}$ to about 30 $kV_{DC}$, e.g., about 10 $kV_{DC}$ to about 25 $kV_{DC}$. In other specific embodiments, the voltage applied is about 10 $kV_{AC}$ (e.g., wherein the voltage refers to the root mean square voltage ($V_{rms}$)) or more. In more specific embodiments, the voltage applied is about 20 $kV_{AC}$ or more, e.g., about 30 $kV_{AC}$ or more. In some specific embodiments, the voltage applied is about 10 $kV_{AC}$ to about 25 $kV_{AC}$. In certain embodiments, a power supply system is configured to provide the voltage to the nozzle. In some embodiments, the alternating voltage ($V_{AC}$) has any suitable frequency, such as about 25 Hz or more, e.g., about 50 Hz to about 500 Hz. In more specific embodiments, the frequency is about 60 Hz to about 400 Hz, e.g., about 60 Hz to about 120 Hz, or about 60 Hz to about 250 Hz.

In certain embodiments, a process herein provides a pressurized gas to an outer inlet of an outer conduit of an electrospray nozzle. In some embodiments, the outer conduit is enclosed along the length of the conduit by an outer wall having an interior surface, the outer conduit having an outer conduit inlet and an outer conduit outlet. In some instances, the pressurized gas is provided from a pressurized canister, by a pump, or by any other suitable mechanism. Generally, providing pressurized gas to the inlet of the outer channel results in a high velocity gas being discharged from the outlet of the outer channel of the electrospray nozzle. Any suitable gas pressure or gas velocity is optionally utilized in processes and/or systems herein. In specific embodiments, the gas pressure applied (e.g., to the inlet of the outer channel) is about 15 psi or more. In more specific embodiments, the gas pressure is about 20 psi or more, about 25 psi or more, about 35 psi or more, about 45 psi or more, or any other suitable pressure. In certain embodiments, the velocity of the gas at the nozzle (e.g., the outlet of the outer channel thereof) is about 1 m/s or more, about 5 m/s or more, or about 25 m/s or more. In more specific embodiments, the velocity is about 50 m/s or more. In still more specific embodiments, the velocity is about 100 m/s or more, e.g., about 200 m/s or more, or about 300 m/s. In certain embodiments, the gas is any suitable gas, such as comprising air, oxygen, nitrogen, argon, hydrogen, or a combination thereof.

In certain embodiments, the inner and outer conduits have any suitable diameter. In some embodiments, the diameter of the outer conduit is about 0.1 mm to about 10 mm, e.g., about 1 mm to about 10 mm. In more specific embodiments, the diameter of the outer conduit is about 0.1 mm to about 5 mm, e.g., about 1 mm to about 3 mm. In certain embodiments, the diameter of the inner conduit is about 0.01 mm to about 8 mm, e.g., about 0.5 mm to about 5 mm, e.g., about 1 mm to about 4 mm. In systems using $V_{AC}$, even larger diameters (e.g., with inner diameters of up to 2.5 cm, or more, with outer diameters being about 1.05 times or more of the inner diameter, about 1.1 times or more of the inner diameter, or the like) are optionally utilized. Generally, as discussed herein, the inner conduit is configured inside the outer conduit, preferably along an identical axis, but slight offset configurations are also considered to be within the scope of the instant disclosure. In some embodiments, an outer wall surrounds the outer conduit, the outer wall having an interior surface (e.g., defining the outer conduit). In some embodiments, the average distance between the exterior surface of the inner wall and the interior surface of the outer wall (referred to herein as the conduit gap) is any suitable distance. In specific instances, the conduit gap is about 0.1 mm or more, e.g., about 0.5 mm or more, or about 1 mm or more. In more specific embodiments, the conduit gap is about 0.5 mm to about 5 mm. In some embodiments, the inner conduit and the outer conduit run along an identical or similar longitudinal axis, the length of which both the inner and outer conduit running along that axis being the conduit overlap length. In some embodiments, the inner conduit length, the outer conduit length, and the conduit overlap length is about 0.1 mm or more, e.g., about 0.1 mm to about 100 mm, or more. In specific embodiments, the inner conduit length, the outer conduit length, and the conduit overlap length is about 0.5 mm to about 100 mm, e.g., about 1 mm to about 100 mm, about 1 mm to about 50 mm, about 1 mm to about 20 mm, or the like. In certain embodiments, the ratio of the conduit overlap length to the first diameter being about 0.1 to about 10, e.g., about 0.1 to about 5 or about 1 to about 10. In some embodiments, the inner conduit is longer than the outer conduit, the inner conduit protruding beyond the outer conduit, e.g., as illustrated in FIG. 8. In some embodiments, the protrusion length is about −0.5 mm to about 1.5 mm, e.g., about 0 mm to about 1.5 mm, or about 0 mm.

In certain embodiments, processes herein comprise collecting and/or systems herein are configured to collect nanoscale particles and/or droplets of the plume onto a substrate. In specific embodiments, collection of these small particles/droplets allows for the formation of a uniform deposition on the substrate. Further, given the small size of the particles and/or droplets formed by systems and processes described herein, it is possible to form depositions having thin and/or uniform layers, and to have good control of the thickness thereof. In some embodiments, the substrate is positioned opposite the outlet of the nozzle.

As discussed herein, processes and systems described herein allow for good control of the thickness of depositions provided for and described herein. In some embodiments, a deposition provided herein is a thin layer deposition, e.g., having an average thickness of about 1 mm or less, e.g., about 1 micron to about 1 mm. In specific embodiments, the deposition has a thickness of about 500 micron or less, e.g., about 1 micron to about 500 micron, about 1 micron to about 250 micron, or about 10 micron to about 200 micron, about 20 micron or less, about 0.5 micron to about 20 micron, or the like. Further, the processes and systems described herein not only allow for the manufacture of thin layer depositions, but of highly uniform thin layer depositions. In some embodiments, the depositions provided herein have an average thickness, wherein the thickness variation is less than 50% of the average thickness, e.g., less than 30% of the average thickness, or less than 20% of the average thickness.

Further, in some embodiments, it is desirable that any additives in the fluid stock are dissolved and/or well dispersed prior to electrospray, e.g., in order to minimize clogging of the electrospray nozzle (and/or other system components), ensure good uniformity of dispersion of any inclusions in the resulting deposition, and/or the like. In specific embodiments, the fluid stock is agitated prior to being provided to the nozzle (e.g., inner conduit inlet thereof), or the system is configured to agitate a fluid stock prior to being provided to the nozzle (e.g., by providing a mechanical stirrer or sonication system associated with a fluid stock reservoir, e.g., which is fluidly connected to the inlet of the inner conduit of an electrospray nozzle provided herein).

In alternative embodiments, an electrode and/or electrode material, such as comprising the component parts described herein, is optionally prepared by steps comprising electrospraying a fluid stock comprising a liquid medium and a nanostructured inclusion comprising an electrode active material, followed by electrospraying a second fluid stock comprising a liquid medium and a graphenic inclusion (e.g., nanostructured graphenic inclusion, such as a graphene component described herein). In some embodiments, the process is optionally repeated until a desired loading and/or thickness is achieved. Further, in some embodiments, an electrode and/or electrode material, such as provided herein, is optionally prepared by steps comprising electrospraying a fluid stock comprising a liquid medium, a nanostructured inclusion comprising an electrode active material, and a graphenic inclusion (e.g., nanostructured graphenic inclusion, such as a graphene component described herein), followed by electrospraying a second fluid stock comprising a liquid medium and a graphenic inclusion (e.g., nanostructured graphenic inclusion, such as a graphene component described herein). In some instances, the later process of electrospraying the second fluid stock facilitates securing in increased amount of active electrode material on the substrate (e.g., current collector), which may, in some instances, improve performance of the electrode and/or electrode material, such as by reducing capacity loss upon cycling. Such fluid stocks comprise any suitable components, concentrations, etc., such as described for the various fluid stocks described herein.

In various embodiments, "electrodes" referred to herein as comprising certain characteristics, functionality, and/or component parts includes a disclosure of electrode materials with the same characteristics, functionality, and/or component parts. In addition, reference to a solution herein, includes liquid compositions wherein inclusion parts are dissolved and/or dispersed therein.

EXAMPLES

Example 1

A fluid stock is prepared by combining silicon nanoparticles, graphene oxide, and water, at a weight ratio of Si NP (7.5%):GO (2.5%):water (90%). The fluid stock is then electrosprayed by injecting the fluid stock into a gas stream, such as using a gas-controlled electrospray nozzle described herein, in the direction of a substrate (e.g., a metal current collector) at a flowrate of 0.2 mL/min under 2 kV/cm. A deposition (electrode) with a mass loading of about 1 to 2 mg/cm$^2$ is collected on the substrate, without the need for adding a binder, or the need for further processing.

Other electrode/current collector systems are also prepared using silicon nanoparticles and graphene oxide, by blending with Super P (Timcal) and poly(acrylic acid) (PAA, MW=3,000,000) in a weight ratio of 80 (active material):10 (super P):10 PAA in N-methyl-2-pyrrolidinone (NMP) in order to make a slurry. In one example, the slurry is drop cast onto a current collector; in another example, the slurry is cast onto a current collector using a doctor blade.

FIG. 13 illustrates images of electrode/current collector compositions prepared according to processes such as those described above, as well as images of such compositions following folding. While the electrospray compositions are instantly, or nearly instantly, dry, the drop cast and doctor blade compositions require up to 6 hours or more to dry in an oven at 120° C. In addition, the electrospray compositions are observed to exhibit excellent uniformity and adhesive properties (i.e., good adhesion of the electrode to the current collector upon folding. The drop cast composition however, has very poor uniformity, with only partial coverage of the current collector in the middle, but exhibits decent adhesion of the electrode to the current collector upon folding. The slurry (doctor blade) composition exibits good uniformity as illustrated in FIG. 13, but also exhibits very poor adhesion (i.e., it exfoliates or delaminates from the current collector upon folding).

In addition, such compositions use much higher amounts of non-active (or lower active) electrode materials during manufacturing and exhibit much lower specific capacities. 2032 Coin cell-typed Li-ion batteries are fabricated by using various negative electrode/current collector systems described herein. For fabricating the half cells, Li metal is used as a counter electrode and polyethylene (ca. 25 μm thickness) is inserted as a separator between working electrode and counter electrode. The coin cell-typed Li-ion batteries are assembled in Ar-filled glove box with electrolyte. A home-made 1M hexafluorophosphate (LiPF$_6$) solution with dimethyl carbonate and fluoroethylene carbonate (50:50 wt/wt %) was used as electrolyte. Half cells were galvanostatically charged and discharged in a voltage window of 0.01-1.5 V vs. Li/Li+, while full cells are operated at 2.5-4.2 V.

FIG. 15 illustrates specific capacities of electrode materials prepared using drop cast and electrospray techniques, such as described above. As is illustrated, the electrodes prepared using the electrospray techniques described herein demonstrate significantly higher specific capacity than electrodes prepared using drop cast techniques, even at a higher charge/discharge rate. Further, FIG. 16 illustrates the improved impedance characteristics of the electrospray manufactured electrode.

In some instances, some delamination or peeling of the electrode is observed, which results in poor contact between the electrode and the current collector, causing poor cell performance. Use of sulfur-containing graphene oxide provided for the manufacture of direct deposit electrodes with better adhesion properties, with less frequent delamination or peeling of the electrode from the current collector substrate when deposited directly thereon.

Example 2

Full cells are prepared using a mixed lithium colbalt oxide (LCO) cathode and the anode of Example 1. FIG. 9 illustrates full cell data therefor at a charge/discharge rate of 0.1 C. As is illustrated, initial specific capacity of the anode is about 1600 mAh/g, with good cycling retention.

Example 3

Electrodes are prepared according to the electrospray techniques described in Example 1. The electrodes are then thermally treated at a temperature of about 200° C. (e.g., to at least partially reduce and/or remove defects of the graphene oxide thereof, thereby converting the graphene oxide to what is referred to herein as reduced graphene oxide). FIG. 5 shows images of the electrosprayed electrode at various magnifications, as well as images of non-thermally treated electrode and thermally treated electrode. FIG. 10 illustrates Coulombic efficiency of various loadings for both thermally treated and non-thermally treated electrodes. As is illustrated, for both loadings, the thermally treated samples (referred to in the figure as "RGO") demonstrate improved Coulombic efficiency, especially at the first cycle, relative to the non-thermally treated analogs. FIG. 12 illustrates a CV curve for both thermally and non-thermally treated electrodes.

Example 4

Using a processes similar as that described in Example 1, an electrode is prepared using a nanofiber and a composite comprising carbon and silicon (e.g., a carbon matrix with silicon nanoparticles embedded therein). Both thermally treated and non-thermally treated anodes are prepared, such as described in Example 3. Further, half-cells are prepared according to a processes similar to that described in Example 1.

FIG. 17 illustrates specific capacity data for such electrodes. As is illustrated, good specific capacities and good retention is obtained, with the thermally treated (denoted with "RGO") samples demonstrating even higher specific capacities.

In addition, a full cell is prepared using the electrode using a method such as described in Example 2. FIG. 7 illustrates the specific capacity of the electrode thereof, with good capacities and retention observed.

Example 5

Using a processes similar as that described in Example 1, an electrode is prepared using a nanofiber and a composite comprising carbon and a tin material (e.g., a carbon matrix with a tin embedded therein). Both thermally treated and non-thermally treated anodes are prepared, such as described in Example 3. Further, half-cells are prepared according to processes similar to that described in Example 1.

FIG. 11 illustrates specific capacity data for such electrodes. As is illustrated, good specific capacities and good retention is obtained, with the thermally treated (denoted with "RGO") samples demonstrating even higher specific capacities.

What is claimed is:

1. A process for manufacturing an electrode directly on a conductive substrate, the electrode comprises a film comprising (a) a plurality of nanostructured inclusions comprising an active material and (b) a first graphenic component comprising a first graphenic web, wherein the nanostructured inclusions are wrapped within the first graphenic web; the process comprising:
   a. producing an electrostatically charged plume comprising a plurality of nanoscale particles and/or droplets from a fluid stock by:
      i. providing the fluid stock to a first inlet of a first conduit of an electrospray nozzle, the first conduit being enclosed along the length of the conduit by a wall having an interior surface and an exterior surface, the first conduit having a first outlet, and the fluid stock comprising a nanostructured inclusion comprising an active material, a graphene oxide, and water, the graphene oxide containing a sulfur atom or sulfur containing compound;
      ii. providing a pressurized gas to a second inlet of a second conduit of the nozzle, thereby providing high velocity gas at a second outlet of the second conduit, the high velocity gas having a velocity of about 5 m/s or more, the second conduit being enclosed along the length of the conduit by a second wall having an interior surface, the second conduit having a second inlet and a second outlet, the second conduit having a second diameter, and the first conduit being positioned inside the second conduit, the exterior surface of the first wall and the interior surface of the second wall being separated by a conduit gap; and
      iii. providing a voltage to the nozzle, the voltage providing an electric field; and
   b. collecting a deposition on the substrate, the deposition comprising (a) a nanostructured inclusion comprising an active material and (b) a second graphenic component, the first and second graphenic components being the same or different.

2. The process of claim 1, wherein the deposition is a thin layer deposition having a thickness of about 200 microns or less.

3. The process of claim 1, wherein water is acidic, having a pH of 1 to 5.

4. The process of claim 1, wherein the active material is a silicon material.

5. The process of claim 4, wherein the silicon material comprises SiOx, wherein x is 0 to about 1.5.

6. The process of claim 5, wherein the silicon material is present in a composite comprising the silicon material and carbon.

7. The process of claim 6, wherein the composite is a nanofiber comprising a carbon matrix with the silicon material embedded therein.

8. The process of claim 4, wherein the silicon material is silicon nanoparticles.

9. The process of claim 1, wherein the active material is a tin material.

10. The process of claim 1, wherein the second graphenic component is reduced graphene oxide.

11. The process of claim 1, wherein the weight ratio of the nanostructured inclusion comprising the active material to the graphene oxide in the fluid stock is about 1:1 to about 1000:1.

12. The process of claim 1, wherein the concentration of the nanostructured inclusion comprising the active material in the fluid stock is about 0.1 wt. % to about 25 wt.%.

13. The process of claim 1, further comprising thermally annealing the deposition to a temperature of at least 100° C.

14. The process of claim 13, wherein the process comprises annealing the deposition to a temperature of 150° C. to 350° C.

15. The process of claim 1, wherein the film comprises a first structure including a plurality of active material nanostructures wrapped and/or secured within a web of the graphenic material and a second structure including a plurality of active material nanostructures wrapped and/or secured within a web of the graphenic material, and wherein the first structure stacks on the second structure to form a layered structure.

16. The process of claim 1, wherein the voltage to the nozzle is provided to the wall of the first conduit.

17. The process of claim 1, wherein the voltage provides an electric field at the first outlet.

* * * * *